(12) United States Patent
Pettersson et al.

(10) Patent No.: US 11,956,471 B2
(45) Date of Patent: Apr. 9, 2024

(54) NORMATIVE INDICATION OF RECOVERY POINT

(71) Applicant: Telefonaktiebolaget LM Ericsson (publ), Stockholm (SE)

(72) Inventors: Martin Pettersson, Vallentuna (SE); Rickard Sjöberg, Stockholm (SE); Mitra Damghanian, Upplands-Bro (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 17/416,591

(22) PCT Filed: Dec. 19, 2019

(86) PCT No.: PCT/SE2019/051317
§ 371 (c)(1),
(2) Date: Jun. 21, 2021

(87) PCT Pub. No.: WO2020/130922
PCT Pub. Date: Jun. 25, 2020

(65) Prior Publication Data
US 2022/0060752 A1 Feb. 24, 2022

Related U.S. Application Data

(60) Provisional application No. 62/782,543, filed on Dec. 20, 2018.

(51) Int. Cl.
*H04N 19/65* (2014.01)
*H04N 19/169* (2014.01)
(Continued)

(52) U.S. Cl.
CPC ........... *H04N 19/65* (2014.11); *H04N 19/172* (2014.11); *H04N 19/188* (2014.11); *H04N 19/70* (2014.11)

(58) Field of Classification Search
CPC .. H04N 19/107; H04N 19/172; H04N 19/188; H04N 19/573; H04N 19/65; H04N 19/68; H04N 19/70
See application file for complete search history.

(56) References Cited

U.S. PATENT DOCUMENTS

2004/0066854 A1* 4/2004 Hannuksela ......... H04N 19/107
375/E7.199
2004/0260827 A1 12/2004 Wang
(Continued)

FOREIGN PATENT DOCUMENTS

CN 105027567 A 11/2015
CN 105075267 A 11/2015
(Continued)

OTHER PUBLICATIONS

Bross et al. ("High Efficiency Video Coding (HEVC) text specification draft 10 (for FDIS & Last Call)", Joint Collaborative Team on Video Coding (JCT-VC) of ITU-T SG 16 WP 3 and ISO/IEC JTC 1/SC 29/WG 11 12th Meeting, vol. JCTVC-L1003_v34, Mar. 19, 2013, XP055126521) (Year: 2013).*
(Continued)

*Primary Examiner* — Maria E Vazquez Colon
(74) *Attorney, Agent, or Firm* — Rothwell, Figg, Ernst & Manbeck, P.C.

(57) ABSTRACT

A method for decoding a video bitstream comprising a sequence of pictures comprising a picture A and a picture B, wherein picture A starts a recovery point period and picture B ends the recovery point period. The method includes obtaining the video bitstream and decoding from the video bitstream a normative indication of the recovery point period. The normative indication of the recovery point period indicates that picture A starts the recovery point period and/or that picture B ends the recovery point period.

19 Claims, 7 Drawing Sheets

(51) Int. Cl.
H04N 19/172 (2014.01)
H04N 19/70 (2014.01)

(56) References Cited

U.S. PATENT DOCUMENTS

| | | | |
|---|---|---|---|
| 2013/0114735 A1* | 5/2013 | Wang | H04N 19/176 375/E7.231 |
| 2013/0294500 A1* | 11/2013 | Wang | H04N 19/70 375/240.02 |
| 2014/0016697 A1 | 1/2014 | Wang | |
| 2014/0016708 A1* | 1/2014 | Wang | H04N 19/50 375/240.25 |
| 2014/0092963 A1 | 4/2014 | Wang | |
| 2014/0092993 A1 | 4/2014 | Wang | |
| 2014/0192896 A1 | 7/2014 | Wang et al. | |
| 2014/0192897 A1* | 7/2014 | Wang | H04N 19/70 375/240.25 |
| 2014/0218473 A1 | 8/2014 | Hannuksela et al. | |
| 2015/0195555 A1 | 7/2015 | Hendry et al. | |
| 2015/0271498 A1 | 9/2015 | Wang et al. | |
| 2015/0271513 A1 | 9/2015 | Hendry et al. | |
| 2015/0382018 A1 | 12/2015 | Hendry et al. | |
| 2016/0094860 A1* | 3/2016 | Minezawa | H04N 19/70 375/240.12 |
| 2020/0177923 A1* | 6/2020 | Chen | H04N 19/107 |

FOREIGN PATENT DOCUMENTS

| | | | |
|---|---|---|---|
| CO | 1514576 A1 | 11/2015 | |
| RU | 2 328 086 C2 | 6/2008 | |
| RU | 2 618 942 C2 | 5/2017 | |
| WO | 2008/084443 A1 | 7/2008 | |
| WO | WO-2013030458 A1 * | 3/2013 | H04N 13/10 |
| WO | 2015013240 A1 | 7/2015 | |
| WO | 2019/193251 A1 | 10/2019 | |

OTHER PUBLICATIONS

"AHG14: Normative Intra Refresh Proposal" Joint Video Experts Team (JVET) of ITU-T SG 16 WP3 and ISO/IEC JTC 1/SC 29/WG 11, 12th Meeting Macao, CN, Oct. 3-12, 2018, Document: JVET-L0161 v3 (5 pages).
"AHG14: Normative Intra Refresh Proposal" Joint Video Experts Team (JVET) of ITU-T SG 16 WP3 and ISO/IEC JTC 1/SC 29/WG 11, 12th Meeting Macao, CN, Oct. 3-12, 2018, Document: JVET-L0161 v2 (5 pages).
"AHG14: Improved Intra Refresh Proposal" Joint Video Experts Team (JVET) of ITU-T SG 16 WP3 and ISO/IEC JTC 1/SC 29/WG 11, 12th Meeting Macao, CN, Oct. 3-12, 2018, Document: JVET-L0161 v1 (5 pages).
"Versatile Video Coding (Draft 3)" Joint Video Experts Team (JVET) of ITU-T SG 16 WP3 and ISO/IEC JTC 1/SC 29/WG 11, 12th Meeting Macao, CN, Oct. 3-12, 2018, Document: JVET-L1001 v5 (193 pages).
"AHG14: Study of Methods for Progressive Intra Refresh" Joint Video Experts Team (JVET) of ITU-T SG 16 WP3 and ISO/IEC JTC 1/SC 29/WG 11, 12th Meeting Macao, CN, Oct. 3-12, 2018, Document: JVET-L0079 (9 pages).
"AHG14 : Study of Methods for Progressive Intra Refresh" Joint Video Experts Team (JVET) of ITU-T SG 16 WP3 and ISO/IEC JTC 1/SC 29/WG 11, 12th Meeting Macao, CN, Oct. 3-12, 2018, Document JVET-L0079, r1 (9 pages).
Ye-Kui Wang, "AHG9: Signalling of regions of interest and gradual decoding refresh", Joint Collaborative Team on Video Coding (JCT-VC) of ITU-T SG 16 WP 3 and ISO/IEC JTC 1/SC 29/WG 11, Document: JCTVC-K0128r2, 11th Meeting: Shanghai, CN Oct. 2012 (6 pages).
Martin Pettersson et al., "AHG14: Normative Recovery Point Indication", Joint Video Experts Team (JVET) of ITU-T SG 16 WP 3 and ISO/IEC JTC 1/SC 29/WG 11, Document: JVET-Mo529-v1, 14th Meeting: Marrakesh, MA, Jan. 2019 (8 pages).
Benjamin Bross et al., "High Efficiency Video Coding (HEVC) text specification draft 10 (for FDIS & Last Call)", Joint collaborative Team on Video Coding (JCT-VC) of ITU-T SG 16 WP 3 and ISO/IEC JTC 1/SC 29/WG 11, Document: JCTVC-L1003_v34, 12 Meeting: Geneva, CH, Jan. 2013 (310 pages).
International Search Report and Written Opinion issued in International Application No. PCT/SE2019/051317 dated Mar. 17, 2020 (14 pages).
Qualcomm Incorporated, HEVC WI: An overview of HEVC's systems and application interfaces, 3GPP TSG-SA4#71, S4-121320, Bratislava, Slovakia, Nov. 2012 (1 page).
Rickard Sjöberg et al., "Overview of HEVC high-level syntax and reference picture management", IEEE, Mar. 2012 (14 pages).
Thomas Schierl et al., "System Layer Integration of HEVC", IEEE, 2011 (13 pages).
International Search Report and Written Opinion issued in Singapore Application No. 11202106524P dated Oct. 24, 2022 (9 pages).
Bross, B. et al., "High Efficiency Video Coding (HEVC) text specification draft 10 (for FDIS & Consent)", Document JCTVC-L1003_v23, Joint collaborative Team on Video Coding (JCT-VC) of ITU-T SG 16 WP 3 and ISO/IEC JATC 1/SC 29/WG 11, 12 Meeting: Geneva, CH, Jan. 14-23, 2013 (11 pages).

* cited by examiner

NORMATIVE INDICATION OF RECOVERY POINT

CROSS REFERENCE TO RELATED APPLICATION(S)

This application is a 35 U.S.C. § 371 National Stage of International Patent Application No. PCT/SE2019/051317, filed Dec. 19, 2019, designating the United States and claiming priority to U.S. provisional application No. 62/782,543, filed on Dec. 20, 2018. The above identified applications are incorporated by reference.

TECHNICAL FIELD

This disclosure relates to video encoding and decoding.

BACKGROUND

1. HEVC and VVC

High Efficiency Video Coding (HEVC), a.k.a. H.265 is a block-based video codec standardized by ITU-T and MPEG that utilizes both temporal and spatial prediction. Spatial prediction is achieved using intra (I) prediction from within the current picture. Temporal prediction is achieved using inter (P) or bi-directional inter (B) prediction on block level from previously decoded reference pictures. The difference between the original pixel data and the predicted pixel data, referred to as the residual, is transformed into the frequency domain, quantized and then entropy coded before transmitted together with necessary prediction parameters such as prediction mode and motion vectors, also entropy coded. By quantizing the transformed residuals, a tradeoff between bitrate and quality of the video may be controlled. The level of quantization is determined by the quantization parameter (QP). The decoder performs entropy decoding, inverse quantization and inverse transformation to obtain the residual, and then adds the residual to an intra or inter prediction to reconstruct a picture.

MPEG and ITU-T is working on the successor to HEVC within the Joint Video Exploratory Team (JVET). The name of this video codec under development is Versatile Video Coding (VCC). When the latest draft of VVC is referred to in this description the version 5 of the VVC draft of JVET-L1001 is considered.

1.1 Slices

The concept of slices in HEVC divides the picture into independently coded slices, where each slice is read in raster scan order in units of CTUs. Different coding types could be used for slices of the same picture, i.e. a slice could either be an I-slice, P-slice or B-slice. The main purpose of slices is to enable resynchronization in case of data loss.

1.2 Tiles

The HEVC video coding standard includes a tool called tiles that divides a picture into rectangular spatially independent regions. Using tiles, a picture in HEVC can be partitioned into rows and columns of samples where a tile is an intersection of a row and a column. The tiles in HEVC are always aligned with CTU boundaries.

VVC is expected to not use traditional slices as in HEVC. Instead tiles are expected to play a larger role in VVC due to increased demand for spatial random access from video services including VR streaming.

The concept of tile groups was agreed to be included in the current VVC draft at the last JVET meeting. A tile group is used to group multiple tiles to reduce the overhead of each tile.

1.3 Parameter Sets

HEVC specifies three types of parameter sets, the picture parameter set (PPS), the sequence parameter set (SPS) and the video parameter set (VPS). The PPS contains data that is common for a whole picture, the SPS contains data that is common for a coded video sequence (CVS) and the VPS contains data that is common for multiple CVSs.

1.4 Intra Random Access Point (IRAP) Pictures

An IRAP picture in HEVC does not refer to any pictures other than itself for prediction in its decoding process and may be the first picture in the bitstream in decoding order or may appear later in the bitstream. The first picture in the bitstream in decoding order must be an IRAP picture. Provided that the necessary parameter sets are available when they need to be activated, the IRAP picture and all subsequent non-random access skipped leading (non-RASL) pictures in decoding order can be correctly decoded without performing the decoding process of any pictures that precede the IRAP picture in decoding order. There may be pictures in a bitstream that do not refer to any pictures other than itself for prediction in its decoding process that are not IRAP pictures.

HEVC specifies three types of IRAP pictures, the broken link access (BLA) picture, the instantaneous decoder refresh (IDR) picture and the clean random access (CRA) picture.

Each IDR picture is the first picture of a CVS in decoding order. An IDR picture may have associated random access decodable leading (RADL) pictures. An IDR picture does not have associated RASL pictures.

Each BLA picture starts a new CVS and has the same effect on the decoding process as an IDR picture. However, a BLA picture contains syntax elements that specify a non-empty reference picture set (RPS). A BLA picture may have associated RASL pictures, which are not output by the decoder and may not be decodable, as they may contain references to pictures that are not present in the bitstream. A BLA picture may also have associated RADL pictures, which are specified to be decoded.

A CRA picture may have associated RADL or RASL pictures. As with a BLA picture, a CRA picture may contain syntax elements that specify a non-empty RPS. For CRA pictures a flag can be set to specify that the associated RASL pictures are not output by the decoder, because they may not be decodable, as they may contain references to pictures that are not present in the bitstream.

1.5 Picture Order Count

In HEVC, the picture order count (POC) is defined as a variable that is associated with each picture, uniquely identifies the associated picture among all pictures in the CVS, and, when the associated picture is to be output from the decoded picture buffer, indicates the position of the associated picture in output order relative to the output order positions of the other pictures in the same CVS that are to be output from the decoded picture buffer.

1.6 NAL Units and Picture Types

The concept of the network abstraction layer (NAL) was introduced in the Advanced Video Coding (AVC) standard and is also used in HEVC. The main goal of the NAL is to provide a network-friendly video representation for various video applications including broadcasting, physical storage, video-on-demand and video streaming using different transport protocols.

All video data is encapsulated into NAL units, where each NAL unit contains an integer number of bytes. The NAL unit in HEVC has a header which specifies the NAL unit type of the NAL unit, the layer ID and the temporal ID for which the NAL unit belongs to. The NAL unit type is transmitted in the nal_unit_type codeword in the NAL unit header and the type indicates and defines how the NAL unit should be parsed and decoded. The rest of the bytes of the NAL unit is payload of the type indicated by the NAL unit type. A bitstream consists of a series of concatenated NAL units. It is tentatively agreed to use NAL units also for VVC.

A NAL unit may contain Video Coding Layer (VCL) or non-VCL data. A VCL NAL unit contains data that represents the values of the samples in the video pictures. A non-VCL NAL unit contains any additional associated data including parameter sets and supplemental enhancement information (SEI) messages, see below. A series of NAL units produced by an encoder is referred to as a NAL unit stream. The table below (TABLE 1), taken from the HEVC specification, defines the HEVC NAL unit type codes and its corresponding NAL unit type class. Here one also sees the different picture types in HEVC. The picture types with NAL unit type between 0 and 9 are inter-coded, i.e. trailing pictures (TRAIL), temporal sublayer access (TSA), stepwise temporal sublayer access (STSA), random access decodable leading (RADL) and random access skipped leading (RASL). The picture types with NAL unit type between 16 and 21 are intra coded intra random access point (IRAP) pictures, i.e. broken link access (BLA), instantaneous decoder refresh (IDR) and clean random access (CRA) pictures.

For single layer coding in HEVC, an access unit (AU) is the coded representation of a picture, which may consist of several video coding layer (VCL) NAL units as well as non-VCL NAL units. A coded video sequence (CVS) in HEVC and in the VVC draft is a series of access units starting at an intra random-access point (IRAP) access unit up to, but not including, the next IRAP access unit in decoding order. The decoding order is the order in which NAL units shall be decoded, which is the same as the order of the NAL units within the bitstream. The decoding order may be different from the output order, which is the order in which decoded pictures are to be output, such as for display, by the decoder.

TABLE 1

| nal_unit_type | Name of nal_unit_type | Content of NAL unit and RBSP syntax structure | NAL unit type class |
|---|---|---|---|
| 0 | TRAIL_N | Coded slice segment of a non-TSA, non-STSA trailing picture | VCL |
| 1 | TRAIL_R | slice_segment_layer_rbsp( ) | |
| 2 | TSA_N | Coded slice segment of a TSA picture | VCL |
| 3 | TSA_R | slice_segment_layer_rbsp( ) | |
| 4 | STSA_N | Coded slice segment of an STSA picture | VCL |
| 5 | STSA_R | slice_segment_layer_rbsp( ) | |
| 6 | RADL_N | Coded slice segment of a RADL picture | VCL |
| 7 | RADL_R | slice_segment_layer_rbsp( ) | |
| 8 | RASL_N | Coded slice segment of a RASL picture | VCL |
| 9 | RASL_R | slice_segment_layer_rbsp( ) | |
| 10 | RSV_VCL_N10 | Reserved non-IRAP SLNR VCL NAL unit types | VCL |
| 12 | RSV_VCL_N12 | | |
| 14 | RSV_VCL_N14 | | |
| 11 | RSV_VCL_R11 | Reserved non-IRAP sub-layer reference VCL NAL unit types | VCL |
| 13 | RSV_VCL_R13 | | |
| 15 | RSV_VCL_R15 | | |
| 16 | BLA_W_LP | Coded slice segment of a BLA picture | VCL |
| 17 | BLA_W_RADL | slice_segment_layer_rbsp( ) | |
| 18 | BLA_N_LP | | |
| 19 | IDR_W_RADL | Coded slice segment of an IDR picture | VCL |
| 20 | IDR_N_LP | slice_segment_layer_rbsp( ) | |
| 21 | CRA_NUT | Coded slice segment of a CRA picture slice_segment_layer_rbsp( ) | VCL |
| 22 | RSV_IRAP_VCL22 | Reserved IRAP VCL NAL unit types | VCL |
| 23 | RSV_IRAP_VCL23 | | |
| 24 . . . 31 | RSV_VCL24 . . . RSV_VCL31 | Reserved non-IRAP VCL NAL unit types | VCL |
| 32 | VPS_NUT | Video parameter set video_parameter_set_rbsp( ) | non-VCL |
| 33 | SPS_NUT | Sequence parameter set seq_parameter_set_rbsp( ) | non-VCL |
| 34 | PPS_NUT | Picture parameter set pic_parameter_set_rbsp( ) | non-VCL |
| 35 | AUD_NUT | Access unit delimiter access_unit_delimiter_rbsp( ) | non-VCL |
| 36 | EOS_NUT | End of sequence end_of_seq_rbsp( ) | non-VCL |
| 37 | EOB_NUT | End of bitstream end_of_bitstream_rbsp( ) | non-VCL |
| 38 | FD_NUT | Filler data filler_data_rbsp( ) | non-VCL |
| 39 | PREFIX_SEI_NUT | Supplemental enhancement information sei_rbsp( ) | non-VCL |
| 40 | SUFFIX_SEI_NUT | | |
| 41 . . . 47 | RSV_NVCL41 . . . RSV_NVCL47 | Reserved | non-VCL |
| 48 . . . 63 | UNSPEC48 . . . UNSPEC63 | Unspecified | non-VCL |

In the latest VVC draft the table (see TABLE 2) is rather short and does not yet contain very specific VCL NAL unit types. The final draft of VVC is expected to have more NAL unit types specified.

TABLE 2

| nal_unit_type | Name of nal_unit_type | Content of NAL unit and RBSP syntax structure | NAL unit type class |
|---|---|---|---|
| 0 | NON_IRAP_NUT | Coded slice segment of a non-IRAP picture slice_layer_rbsp( ) | VCL |
| 1 | IRAP_NUT | Coded slice of an IRAP picture slice_layer_rbsp( ) | VCL |
| 2-15 | RSV_VCL_NUT | Reserved VCL NAL Units | VCL |
| 16 | SPS_NUT | Sequence parameter set seq_parameter_set_rbsp() | non-VCL |
| 17 | PPS_NUT | Picture parameter set pic_parameter_set_rbsp( ) | non-VCL |
| 18 | EOS_NUT | End of sequence end_of_seq_rbsp( ) | non-VCL |
| 19 | EOB_NUT | End of bitstream end_of_bitstream_rbsp( ) | non-VCL |
| 20, 21 | PREFIX_SEI_NUT SUFFIX_SEI_NUT | Supplemental enhancement information sei_rbsp( ) | non-VCL |
| 22-26 | RSV_NVCL | Reserved | non-VCL |
| 27-31 | UNSPEC | Unspecified | non-VCL |

2. Recovery Points

A recovery point is used to perform a random access operation in a bitstream using only temporal predicted pictures. A recovery point is also useful for refreshing the video in case of video data loss.

A decoder performing a random access operation in a bitstream decodes all pictures in a recovery point period without outputting them. When it reaches the last picture of the recovery point period, the recovery point picture, the video has been fully refreshed and the recovery point picture and the following picture may be outputted. The recovery point mechanism is sometimes referred to as gradual decoding refresh (GDR) since it refreshes the video gradually picture by picture.

In practice a GDR is created by gradually refreshing the video using intra coded blocks (e.g. CTUs). For each picture in the recovery point period a larger part of the video is refreshed until the video has been fully refreshed.

FIG. 1A and FIG. 1B shows two different example patterns for gradual decoding refresh of the video over five pictures. The white blocks are non-refreshed blocks (or "dirty" blocks), dark grey blocks are intra coded blocks, and dark and medium grey blocks are refreshed blocks (or "clean" blocks). FIG. 1A illustrates gradual refresh using vertical lines of intra coded blocks. FIG. 1B illustrates gradual refresh using a pseudo-random pattern. Other common patterns exist too, including horizontal lines and block-by-block in raster scan order. The blocks in the example may be CTUs.

Refreshed blocks may be configured to only predict from other refreshed blocks in the current (spatial intra prediction) and previous pictures (temporal prediction). This prevents artifacts from spreading into refreshed areas between pictures.

Slices or tiles can be used to restrict predictions between non-refreshed and refreshed blocks in an efficient way since slice and tile boundaries may turn off predictions across the boundaries but allow predictions elsewhere. In the first example, the picture may be divided into two tiles where one tile comprises the refreshed blocks and the other tile comprises the non-refreshed blocks. This is illustrated in FIG. 1C, which shows an example of using the restrictions in tiles for GDR. Tile borders are shown with thick lines. One tile is used for the clean area and one tile is used for the dirty area Note that the tile distribution and tile sizes are then not constant over time. Some degree of artifacts could alternatively be allowed by not restricting, or just partially restricting temporal and spatial prediction to refreshed areas.

2.1 Recovery Point SEI message in HEVC

A mechanism used in AVC and HEVC for sending messages in the bitstream that are not strictly needed for the decoding process but may aid the decoder in various ways, is the supplemental enhancement information (SEI) messages. SEI messages are signaled in a SEI NAL unit, but are not normative—i.e., not mandatory for a decoder conforming to HEVC to support. As noted in the HEVC specification: "SEI messages assist in processes related to decoding, display or other purposes. However, SEI messages are not required for constructing the luma or chroma samples by the decoding process. Conforming decoders are not required to process this information for output order conformance to this Specification (see Annex C and clause F.13 for the specification of conformance). Some SEI message information is required to check bitstream conformance and for output timing decoder conformance."

One SEI message defined by HEVC and AVC is the Recovery Point SEI message. The recovery Point SEI message is sent in the position (at the picture) in the bitstream where the recovery period starts. When a decoder tunes in to the bitstream, it may start decoding all pictures in decoding order from this position without outputting them, until it reaches the recovery point picture, from where all pictures should be fully refreshed and ok to output.

The syntax for the recovery point SEI in HEVC is shown below in TABLE 3.

TABLE 3

| | Descriptor |
|---|---|
| recovery_point( payloadSize ) { | |
|   recovery_poc_cnt | se(v) |

TABLE 3-continued

| | Descriptor |
|---|---|
| exact_match_flag | u(1) |
| broken_link_flag | u(1) |
| } | | recovery_poc_cnt specifies the recovery point picture from where the decoder can start outputting pictures.
exact_match_flag equal to 1 specifies that the recovery point picture resulting from tuning in to the recovery point exactly matches the recovery point picture as if the bitstream was decoded from the previous IRAP picture.
exact_match_flag equal to 0 specifies that the recovery point picture should be virtually the same as if the bitstream was decoded from the previous IRAP picture, but it may not be an exact match.
broken_link_flag is used to indicate if there is a broken link in the bitstream at the location of the SEI message. If the broken link flag is set equal to 1, pictures produced by starting the decoding at the location of a previous IRAP picture may contain undesirable visual artifacts that should not be displayed before the recovery picture.

2.2 Work on Recovery Points in NVET

At the 11$^{th}$ JVET meeting in Ljubljana an ad hoc group (AHG14) was formed to study recovery points for VVC. For the following meeting in Macao the following two proposals were discussed:

In JVET-L0079, it is first discussed what non-normative changes needs to be done to the coding tools on the encoder side to enable exact match using the Recovery point SEI message in HEVC. The coding tools discussed are advanced temporal MV prediction (ATMVP), intra prediction, intra block copy, inter prediction, and in-loop filters comprising the sample adaptive offset (SAO) filter, deblocking filters and the adaptive loop filter (ALF). The document also discusses some normative changes that could be applied to the coding tools to increase compression efficiency.

JVET-L0161 proposes to signal information about the intra refresh in the SPS, PPS and at the slice level. The signaled intra refresh information in SPS/PPS comprises a flag for enabling intra refresh tools, intra refresh mode (column, line, pseudo), size of the intra refresh pattern (e.g. width of column or length of line) and intra refresh delta QP. The signaled intra refresh information at slice level comprises intra refresh direction (right to left/left to right/top to bottom/bottom to top) to be used to determine motion vector constraints, and intra refresh position specifying the position of the intra refresh blocks given by the size of the intra refresh pattern. The intra refresh pattern is derived at the picture level according to the intra refresh position values if a CU belongs to the intra refresh area.

SUMMARY

Certain challenges exist. For example, a problem with the current solution in HEVC to send a Recovery Point in an SEI message is that the encoder may not be aware if an unknown decoder supports the recovery point SEI message or not and thus the encoder needs to send periodic IRAP pictures to ensure that the decoder will be able to tune in to a bitstream. This is sub-optimal in terms of bandwidth and may constitute a bottleneck for low-delay applications.

The recovery point SEI message may not be supported in a consistent way in external specifications, e.g. in Digital Video Broadcasting (DVB) specifications and in the ISO/IEC 1449-15 specification, which may cause interoperability issues.

It seems useful to allow a CVS to start with a recovery point, e.g. after splitting low-delay bitstreams encoded with recovery points for instance for recording or archiving purposes. However, a bitstream starting with a non-IRAP picture and a recovery point SEI message is not a legal bitstream in neither of AVC, HEVC, nor the VVC draft, since SEI messages are not normatively specified.

JVET-L0079 and JVET-L0161 focus on restrictions to coding tools to support GDR, which may anyway be fixed by using border restrictions of tiles. JVET-L0079 does not mention any other solution for indicating the start and end of a recovery point apart from the Recovery point SEI message in HEVC. Indicating the presence of recovery points non-normatively in a SEI message may cause issues if support of the recovery points in coding tools is specified normatively in VVC.

Certain aspects of the present disclosure and their embodiments may provide solutions to these or other challenges. In one aspect, the problems mentioned above are solved by signaling by normative means the indication of the recovery point (a.k.a., "the recovery point indication"). Various ways of signaling the normative recovery point indication are described herein.

In a first embodiment the generic solution for signaling a recovery point indication in a normative way is described.

In a second preferred embodiment the recovery point indication is signaled in a non-VCL NAL unit.

In a third embodiment, the start and end of the recovery period is signaled by VCL NAL units using new recovery point indication VCL NAL unit types.

In a fourth embodiment a VCL NAL unit and a non-VCL picture type NAL unit are defined, where the random access point indication is signaled in the non-VCL picture type NAL unit.

In a fifth embodiment the recovery point indication is signaled in the PPS

In a sixth embodiment the recovery point indication is signaled in a picture header In a seventh embodiment the scope of the recovery point is not the whole picture but a segment of the picture.

In an eighth embodiment it is signaled in the SPS whether the bitstream supports recovery points or not.

Certain embodiments may provide one or more of the following technical advantage(s). For example, having the indication of the recovery point normatively specified has the following advantages:

(1) The encoder will know that all decoders support the normative recovery point indication. Thus, no additional IRAP pictures need to be encoded to ensure random access when the decoder implementation is unknown.

(2) Alignment between external specifications is ensured. By a normative signaling of the recovery point indication in the VVC specification, there is no need for external specifications to mandate the SEI message. Thus, the usage of recovery points would be aligned between external specifications.

(3) Splitting of bitstreams on recovery points is enabled. A bitstream encoded with normative recovery points may be partitioned into legal CVSs at the recovery points. A CVS may thus start with a recovery point access unit.

(4) Specific coding level tools may be used for recovery points. Normative coding level tools for progressive intra refresh may be defined for VVC. Indicating the presence of recovery points normatively enables normative progressive intra coding tools to be used for random access in a straight-forward way. Since SEI messages are not normative, it is not mandatory for a decoder to decode them. Introducing mandatory syntax, semantics or processes based on SEI messages is not possible but basing them on normative recovery point information would not have any such problems.

Also, having the indication of the recovery point specified as a non-VCL NAL unit type according to the second embodiment has the following advantages:

(1) The recovery point indication is easily accessed from the systems layer;
(2) A decoder only needs to parse the NAL unit headers to know where possible recovery point tune in points are located in the bitstream; and
(3) Using a non-VCL NAL unit type would add signaling overhead in the bitstream only when the recovery point indication is present, i.e. no need to signal any data indicating that there is no recovery point.

In one aspect a method for decoding a video bitstream is provided. The video bitstream comprises a sequence of pictures comprising a picture A and a picture B, wherein picture A starts a recovery point period and picture B ends the recovery point period. The method includes obtaining the video bitstream and decoding from the video bitstream a normative indication of the recovery point period, wherein the normative indication of the recovery point period indicates that picture A starts the recovery point period and/or that picture B ends the recovery point period.

In another embodiment the method for decoding the bitstream includes the steps of obtaining from the bitstream a normative recovery point period indication (RPI) and determining a value from one or more syntax elements of the normative RPI, wherein the value specifies a recovery point picture.

In another embodiment the method for decoding the bitstream includes the steps of receiving a network abstraction layer, NAL, unit contained in the bitstream, the NAL unit containing a type value; determining whether the type value specifies that the NAL unit comprises recovery point picture information that identifies a recovery point picture; and determining the recovery point picture based on the recovery point picture information.

In one aspect a method for encoding a bitstream is provided. The method includes the steps of: determining whether a particular picture is the start of a recovery point period, wherein a recovery point picture is the last coded picture in decoding order in the recovery point period, and, as a result of determining that the particular picture is the start of the recovery point period, then performing the steps of: a) defining the particular picture as a gradual decoding refresh, GDR, picture; b) determining the recovery point picture; and c) encoding a normative recovery point period indication in the bitstream, wherein the normative recovery point period indication comprises information indicating the position of the recovery point picture in the bitstream and/or information indicating the position of the particular picture in the bitstream.

In another embodiment the method for encoding the bitstream includes the steps of determining whether a particular picture is the start of a recovery point period, and, as a result of determining that the particular picture is the start of the recovery point period, then performing the steps of: determining a position of a recovery point picture for the recovery point period; and encoding to the bitstream a recovery point period indication, RPI, network abstraction layer, NAL, unit.

In another aspect a computer program is provided. The computer program includes instructions which when executed by processing circuitry causes the processing circuitry to perform any of the method described herein. In another aspect a carrier is provided, where the carrier contains the computer program and the carrier is one of an electronic signal, an optical signal, a radio signal, and a computer readable storage medium.

In another aspect a decoding apparatus for decoding a video bitstream is provided. The video bitstream includes a picture A and a picture B, wherein picture A starts a recovery point period and picture B ends the recovery point period. The decoding apparatus is adapted to: obtain the video bitstream; and decode from the video bitstream a normative indication of the recovery point period, wherein the normative indication of the recovery point period indicates that picture A starts the recovery point period and/or that picture B ends the recovery point period. In one embodiment the decoding apparatus includes a computer readable storage medium; and processing circuitry coupled to the computer readable storage medium, wherein the processing circuitry is configured to cause the decoding apparatus to perform any one of the methods disclosed herein.

In another aspect an encoding apparatus for encoding a video bitstream is provided. The encoding apparatus is adapted to determine whether a particular picture is the start of a recovery point period, wherein a recovery point picture is the last coded picture in decoding order in the recovery point period; and, as a result of determining that the particular picture is the start of the recovery point period, then perform the steps of: a) defining the particular picture as a gradual decoding refresh, GDR, picture; b) determining the recovery point picture; and c) encoding a normative recovery point period indication in the bitstream, wherein the normative recovery point period indication comprises information indicating the position of the recovery point picture in the bitstream and/or information indicating the position of the particular picture in the bitstream.

BRIEF DESCRIPTION OF THE DRAWINGS

The accompanying drawings, which are incorporated herein and form part of the specification, illustrate various embodiments.

DETAILED DESCRIPTION

Figure 1A:
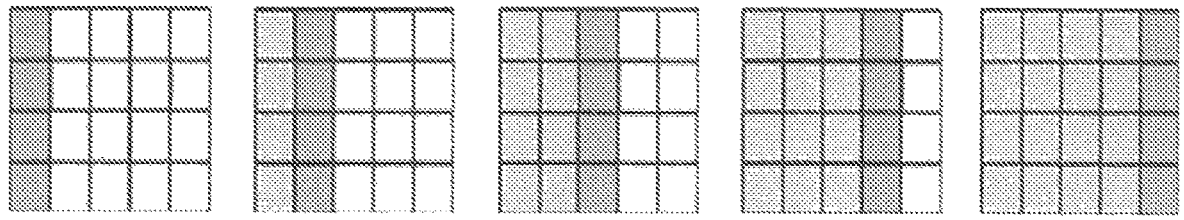
FIG. 1A shows an example pattern for gradual decoding refresh (GDR) of a video over five pictures.
Figure 1B:
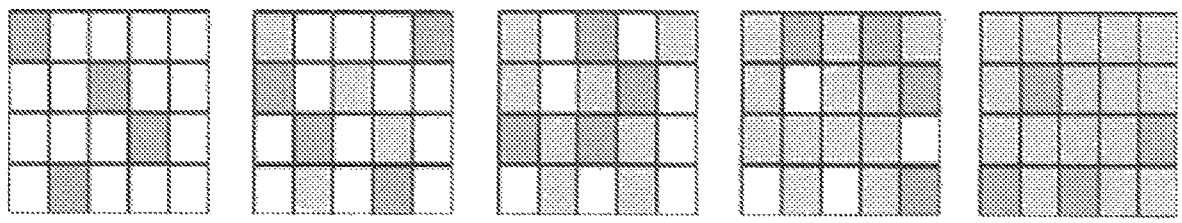
FIG. 1B shows another example pattern for GDR of a video over five pictures.
Figure 1C:
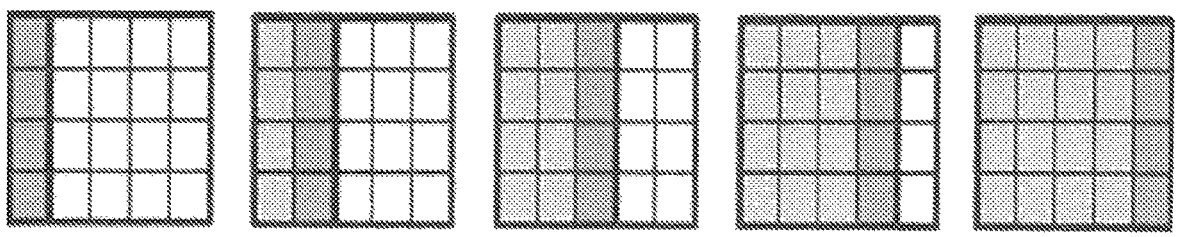
FIG. 1C shows an example of using the restrictions in tiles for GDR.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Additional information may also be found in the document(s) provided in the Appendix.

Terminology

Intra random access point (IRAP) picture: A coded picture which does not reference other pictures than itself for prediction. An IRAP picture may be used for random access.

Recovery point: A position in the bitstream where a random access operation can be performed without the use of any IRAP picture Recovery point period: The period of the recovery point, i.e. the period from the first picture where the refresh is started until the last picture where the video is fully decoded when a recovery point random access operation is performed. The term recovery period is used interchangeably with recovery point period in this description.

Gradual decoding refresh (GDR) picture: The first picture in a recovery point period. The refresh is starting at this picture. The term recovery point begin (RPB) picture is used interchangeably with GDR picture in this description.

Recovery point picture: The last picture in the recovery point period. When this picture, and the previous pictures in the recovery point period have been decoded, the video is fully refreshed.

1. Normative Indication of Recovery Point

In this embodiment, the presence of a recovery point is indicated in a normative way, in contrast to HEVC where the recovery point is signaled in a non-normative SEI message.

The recovery point indication specifies 1) where the recovery point period begins, i.e. the position of the GDR picture where the refresh is initiated, and 2) where the recovery point ends, i.e. identification or position of the recovery point picture, where the video has been fully refreshed. The position of the GDR picture can be explicitly signaled, for example by syntax elements of a picture or syntax elements included in the access unit of the picture. In an embodiment, the recovery point indication is signaled at the position of the GDR picture in the bitstream. In an embodiment, the position of the recovery point picture is explicitly signaled together with the recovery point indication. The position of the recovery point picture may be signaled by information sent with the GDR picture or in the access unit of the GDR picture, for example by signaled information such that a decoder can derive an ID for the recovery point picture when the GDR picture or the GDR access unit is decoded. The decoder may then check for a match with the ID while decoding pictures that follow the GDR picture in decoding order and the picture with a match is identified as the recovery point picture. The derived ID may be a frame number, a picture order count number, a decoding order number, or any other number that a decoder derives for decoded pictures and may act as a picture identifier.

1.1 Random Access Using a Normative Recovery Point

When tuning in to a bitstream at a recovery point, i.e. performing a random access to the bitstream or if the bitstream starts with a recovery point, the decoder first locates a normative recovery point indication in the bitstream. Since it is known by the encoder that the decoder shall support recovery points, the bitstream can be encoded with recovery points as the only type of random access points, which will enable random access operations while fulfilling low-delay requirements at the same time. After the recovery point indication has been located, the start and end of the recovery point is identified before the pictures in the recovery point period are decoded starting from the GDR picture. The pictures in the recovery point period should not be output, except for the recovery point picture.

A decoder may suppress output of those pictures although the bitstream otherwise specifies that they should be output. In one version, output of the pictures in the corresponding recovery point period except the recovery point picture are normatively suppressed if a random access operation is done at the recovery point. From the recovery point picture and onwards, pictures are decoded and output as normal.

In an alternative version of this embodiment, the recovery point picture is the last picture in decoding order that is not output. In this case, the decoder does not output any picture in the recovery point period, including the recovery point picture, but starts outputting pictures that follow the recovery point picture in decoding order.

1.2 Generation of Unavailable Reference Pictures

Figure 2:
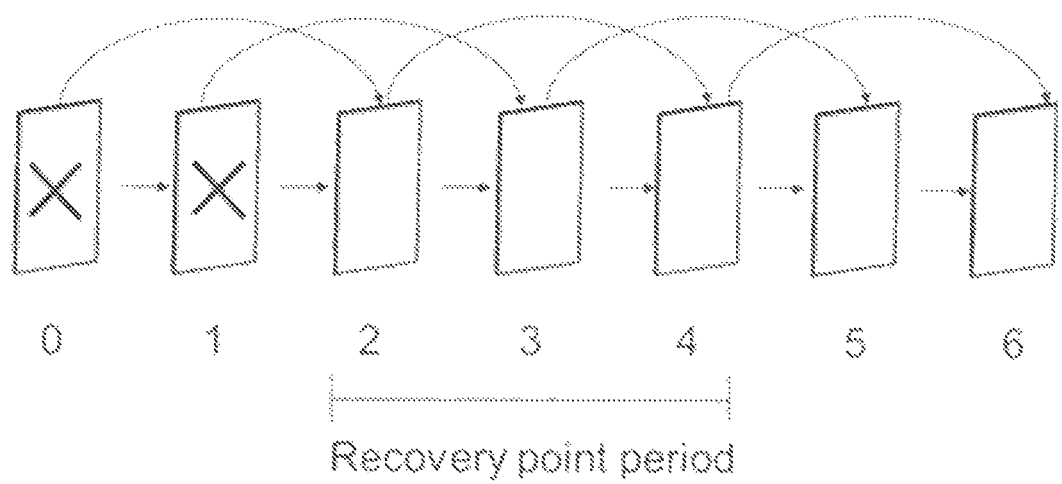
FIG. 2 illustrates an example of a reference structure for low-delay video.

When the decoder tunes in to a bitstream at a recovery point, pictures referenced by the pictures in the recovery point period may not be available, if they are located before the recovery point indication in decoding order (see FIG. 2). In embodiment, such unavailable pictures are generated before the decoding of the pictures in the recovery point period. Generation of an unavailable picture may comprise allocating memory for a picture, setting block sizes in that picture to specific values, setting the POC value of that picture to a specific value, etc. In particular, when generating an unavailable reference picture each value in the sample array of the picture may be set to a specific value, for instance a midgray color, and each prediction mode of the reference picture could be set to be mode intra. This is further described below.

Referring now to FIG. 2, FIG. 2 illustrates an example of a reference structure for low-delay video. In FIG. 2, pictures 2-4 are included in a recovery point period associated with a recovery point, where picture 2 is the GDR picture and picture 4 is the recovery point picture. If the decoding is initialized at the recovery point, pictures 0 and 1 referenced by the pictures in the recovery point period are unavailable and shall be generated to prevent decoder crash (e.g., generated as described above).

If a picture in the recovery point period is lost (in the same temporal layer or below), the recovery process cannot guarantee a full recovery. The decoder could then wait for the next recovery point or try to perform error concealment.

1.3 Starting a CVS with a Recovery Point

Defining the recovery point indication in a normative way enables a CVS to start with a recovery point. This may be useful after splitting a low-delay coded bitstream encoded with recovery points to support random access.

In the current draft of VVC, a CVS is defined as:
coded video sequence (CVS): A sequence of access units that consists, in decoding order, of an IRAP access unit, followed by zero or more access units that are not IRAP access units, including all subsequent access units up to but not including any subsequent access unit that is an IRAP access unit.

An access unit is defined as:
access unit: A set of NAL units that are associated with each other according to a specified classification rule, are consecutive in decoding order, and contain exactly one coded picture.

Below is an example text for the definition of a CVS for a first version of the embodiment that allows a normatively specified recovery point to start a CVS, where a recovery point indication access unit is an access unit associated with the GDR picture of the recovery point:

coded video sequence (CVS): A sequence of access units that consists, in decoding order, of an IRAP access unit or a recovery point indication access unit, followed by zero or more access units that are not IRAP access units, including all subsequent access units up to but not including any subsequent access unit that is an IRAP access unit.

In one version of this embodiment a recovery point indication access unit also defines the end of a CVS. Example text for the definition of CVS is shown below:

coded video sequence (CVS): A sequence of access units that consists, in decoding order, of an IRAP access unit or a recovery point indication access unit, followed by zero or more access units that are not IRAP access units and not recovery point indication access units, including all subsequent access units up to but not including any subsequent access unit that is an IRAP access unit or a recovery point access unit.

The recovery point indication access unit could alternatively be called something else, for instance GDR access unit, or Recovery Point Begin (RPB) access unit.

In another version of the embodiment a random access point (RAP) access unit is defined, which could comprise either an IRAP picture or the GDR picture of the recovery point:

coded video sequence (CVS): A sequence of access units that consists, in decoding order, of a RAP access unit, followed by zero or more access units that are not RAP access units, including all subsequent access units up to but not including any subsequent access unit that is a RAP access unit.

random access point (RAP) access unit: An access unit in which the coded picture is an IRAP picture or in which the access unit contains a recovery point indication.

1.4 Exact Match

Exact match could be made by restricting prediction from non-refreshed areas to refreshed areas. In an embodiment, only exact match is allowed, meaning that prediction from non-refreshed areas is not allowed during recovery point periods. This ensures that the following pictures are always identical regardless if the decoding was started at the recovery point or not.

In another version, a functionality similar to the exact_match_flag in the recovery point SEI message is used in the normative indication of the recovery point, meaning that the pictures following the recovery point picture may not be identical depending on if the decoding was started at the recovery point or not.

1.5 Encoder and Decoder Steps

Example encoding steps, where all or some of the steps are processed for encoding a bitstream with recovery points using normative indication of recovery points, are shown below:

For each picture to be encoded to the bitstream:
1. If the picture is the start of a recovery point
   a. Define the picture as a GDR picture
   b. Determine the recovery point period and the future recovery point picture position
   c. Encode a normative recovery point indication in the bitstream (i.e., add to the bitstream an encoded normative recovery point indication)
   d. Encode a SPS in the bitstream
   e. Encode a PPS in the bitstream
   f. Encode the GDR picture using partial intra refresh
2. else if the picture is inside the recovery point period
   Encode the picture using partial intra refresh
   else
   Encode picture normally Example decoding steps, where all or some of the steps are executed for tuning in to a bitstream with recovery points using normative indication of recovery points, are shown below:

1. Scan bitstream for a normative recovery point indication
2. When a normative recovery point indication is found, determine a recovery_point_POC value from one or more syntax elements in the normative recovery point indication
3. Decode SPS from the bitstream
4. Decode PPS from the bitstream
5. Do {
   a. Start decoding a next current picture and derive its POC value currPOC. If currPOC is less than recovery_pont_POC, do steps b and c
   b. Generate unavailable reference pictures for those pictures that are referenced by the current picture but have not been decoded
   c. Decode the current picture without outputting it, for example by setting a state for the current picture indicating that it shall not be output
   } while (currPOC<recovery_point_POC)
6. Decode and output the current picture (the recovery point picture) and the following pictures When starting a CVS with a recovery point, the first step of scanning the bitstream for a normative recovery point indication, is not necessary.

In one version of the embodiment, if the associated SPS and PPS can be acquired by other means, for instance from an earlier instance in the bitstream or signaled out-of-band, it is not necessary to have the SPS or PPS encoded in or decoded from the same access unit as the recovery point indication 2. Recovery Point Indication in its Own Recovery Point Indication NAL Unit In an embodiment, the presence of a recovery point is indicated by a recovery point indication NAL unit. The indication is based on the presence of a recovery point indication NAL unit such that if a recovery point indication NAL unit is present, a recovery point is indicated. If a recovery point indication NAL unit is not present, a recovery point is not indicated. The recovery point is preferably indicated using a non-VCL NAL unit type, meaning that the NAL unit does not contain any video coding layer data. In contrast to HEVC, which signals the recovery point SEI in a non-normative (i.e., not mandatory to support) SEI message (which in turn is signaled in a SEI NAL unit), the idea is to use a dedicated NAL unit type for the recovery point. In this way, the recovery point becomes normative—i.e., a part of the specification.

Figure 3:
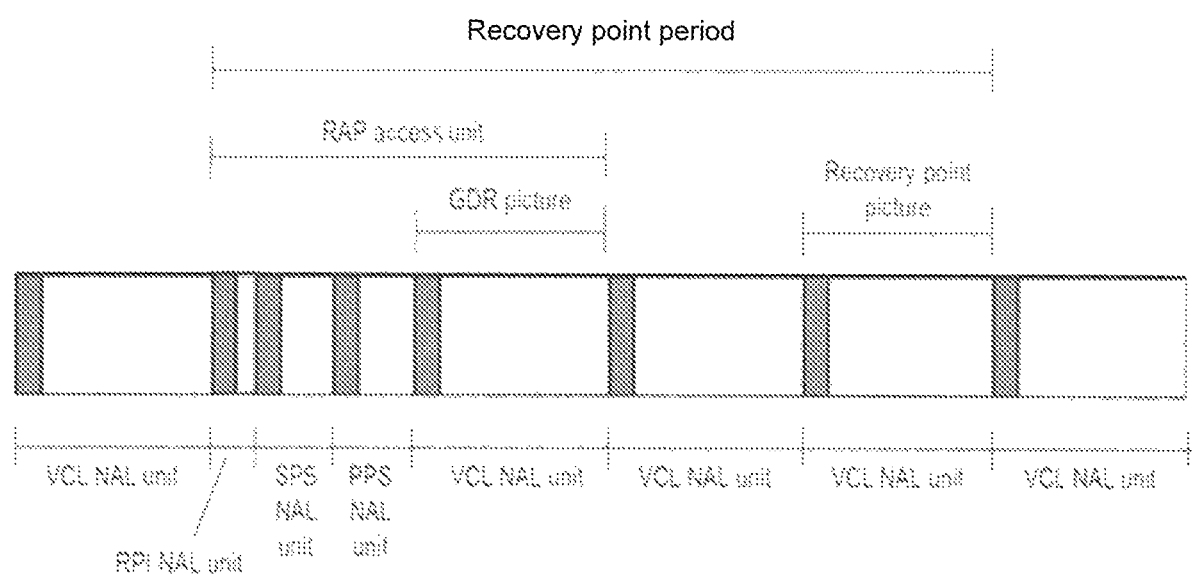
FIG. 3 illustrates an example of using a recovery point indication (RPI) NAL unit to indicate a recovery point in a bitstream.

FIG. 3 illustrates an example of using a recovery point indication (RPI) NAL unit to indicate a recovery point in a bitstream. That is, FIG. 3 illustrates a bitstream containing an RPI NAL unit (NAL unit headers are marked in gray). In the illustrated example, the bitstream contains one VCL NAL unit per picture, i.e. one slice or one tile group per picture. The RPI NAL unit is placed before the VCL NAL unit containing the GDR picture that begins the refresh.

In one version of this embodiment, the VCL NAL unit type of the GDR picture and all other pictures in the recovery point period may be of any picture type. In another version, the picture types of the pictures in the recovery point period are restricted to certain picture types.

In one version, the recovery point indication NAL unit is placed before any SPS and PPS in the access unit in case there is any SPS or PPS in the access unit. In other versions, the SPS and/or PPS is placed before the recovery point indication in the access unit or signaled out-of-band.

In one version, the recovery point indication NAL unit is located before any VCL NAL unit in the access unit associated with the GDR picture. This access unit may be referred to as a recovery point access unit or a recovery point begin (RPB) access unit, as in the example definition below. The access unit may alternatively, as in the example in FIG. 3, be referred to as a random access point (RAP) access unit. In one version of the embodiment, the IRAP access unit in VVC is replaced with a RAP access unit, which is an access unit in which the coded picture is an IRAP picture or an access unit that contains a recovery point indication NAL unit.

Below is an example set of definitions, syntax, and semantics of how the recovery point indication could be specified as a NAL unit type on top of the latest VVC draft:
  3.18 coded video sequence (CVS): A sequence of access units that consists, in decoding order, of an IRAP access unit or an RPB access unit, followed by zero or more access units that are not IRAP access units, including all subsequent access units up to but not including any subsequent access unit that is an IRAP access unit.
  3.74 recovery point: A point in the bitstream where the next bit in the bitstream is the first bit of a RPB access unit.
  3.75 recovery point begin (RPB) access unit: An access unit that contains a recovery point indication NAL unit.
  3.76 recovery point begin (RPB) picture: The coded picture in an RPB access unit.
  3.77 recovery point period: The set of pictures including an RPB picture and all pictures that follow the RPB picture until and including the recovery point picture indicated by the recovery point indication NAL unit in the access unit containing the RPB picture.
  3.78 recovery point picture: The last coded picture in decoding order in a recovery point period.

The table below illustrates the Recovery Point Indication raw byte sequence payload (RBSP) syntax:

| | Descriptor |
|---|---|
| recovery_point_indication_rbsp( ) { | |
|   recovery_poc_cnt | se(v) |
|   rbsp_trailing_bits( ) | |
| } | |

The table below defines NAL unit header semantics:

| nal_unit_type | Name of nal_unit_type | Content of NAL unit and RBSP syntax structure | NAL unit type class |
|---|---|---|---|
| 0 | NON_IRAP_NUT | Coded slice segment of a non-IRAP picture slice_layer_rbsp( ) | VCL |
| 1 | IRAP_NUT | Coded slice of an IRAP picture slice_layer_rbsp( ) | VCL |
| 2-15 | RSV_VCL_NUT | Reserved VCL NAL Units | VCL |
| 16 | SPS_NUT | Sequence parameter set seq_parameter_set_rbsp( ) | non-VCL |
| 17 | PPS_NUT | Picture parameter set pic_parameter_set_rbsp( ) | non-VCL |
| 18 | EOS_NUT | End of sequence end_of_seq_rbsp( ) | non-VCL |
| 19 | EOB_NUT | End of bitstream end_of_bitstream_rbsp( ) | non-VCL |
| 20 | RPI_NUT | Recovery point indication recovery_point_indication_rbsp( ) | non-VCL |
| 21, 22 | PREFIX_SEI_NUT SUFFIX_SEI_NUT | Supplemental enhancement information sei_rbsp( ) | non-VCL |
| 23-26 | RSV_NVCL | Reserved | non-VCL |
| 27-31 | UNSPEC | Unspecified | non-VCL |

When nal_unit_type is equal to RPI_NUT (i.e., type = 20), TemporalId shall be equal to 0.

The recovery Point Indication RBSP semantics may be defined as follows:
  The RPI NAL unit shall precede any VCL NAL units in the access unit containing the RPI NAL unit. All VCL NAL units in an access unit containing the RPI NAL unit shall have TemporalId equal to 0.
  If an RPB access unit containing an RPI NAL unit is not the first access unit in the CVS and a random access operation is not initialized at the RPB access unit, the RPI NAL unit in the RPB access unit shall be ignored.
  Otherwise, if an RPB access unit containing an RPI NAL unit is the first access unit in the CVS or a random access operation is initialized at the RPB access unit, the following applies:
    The decoder shall generate all reference pictures included in the RPS of the recovery point begin (RPB) picture of the RPB access unit according to the process described in [see example specification text 8.2.1.1 below for this].
    The poc_msb_cycle_val for the RPB picture shall be set to 0 when deriving the PicOrderCntVal for the RPB picture
    The RPB picture and all pictures that follow the RPB picture in decoding order shall be decoded.
    The RPB picture and all pictures that follow the RPB picture in decoding order until but not including the recovery point picture, shall not be output.
    Any SPS or PPS RBSP that is referred to by the picture in a RPB access unit or by any picture following that picture in decoding order shall be available to the decoding process prior to its activation.
  It is a requirement of bitstream conformance that the decoded pictures that follow the recovery point picture in decoding order shall be an exact match to the pictures that would be produced by starting the decoding process at the location of an IRAP or RPB access unit that precedes the RPB picture that belong to the same recovery point period as the recovery point picture in decoding order, if any, in the bitstream.

recovery_poc_cnt specifies picture order count of the recovery point picture. The picture that follows the current picture in decoding order that has PicOrderCntVal equal to the PicOrderCntVal of the current picture plus the value of recovery_poc_cnt is referred to as the recovery point picture. The recovery point picture shall not precede the current picture in decoding order. The value of recovery_poc_cnt shall be in the range of −MaxPicOrderCntLsb/2 to MaxPicOrderCntLsb/2−1, inclusive.

In other versions of this embodiment one or more of a pointer to the recovery point picture (e.g., the recovery_poc_count value), exact match flag and broken link flag are signaled in the recovery point indication NAL unit. Syntax and semantics are shown below. Note that the presence of a broken link flag in a normatively specified recovery point indication NAL unit may replace the need for specifying a BLA picture type as in HEVC.

|  | Descriptor |
| --- | --- |
| recovery_point_indication_rbsp( ) { |  |
|   recovery_poc_cnt | se(v) |
|   exact_match_flag | u(1) |
|   broken_link_flag | u(1) |
|   rbsp_trailing_bits( ) |  |
| } |  | exact_match_flag indicates whether decoded pictures at and subsequent to the specified recovery point in output order derived by starting the decoding process at the access unit associated with the recovery point indication will be an exact match to the pictures that would be produced by starting the decoding process at the location of a previous IRAP access unit, if any, in the bitstream. The value 0 indicates that the match may not be exact and the value 1 indicates that the match will be exact. When exact_match_flag is equal to 1, it is a requirement of bitstream conformance that the decoded pictures at and subsequent to the specified recovery point in output order derived by starting the decoding process at the access unit associated with the recovery point indication shall be an exact match to the pictures that would be produced by starting the decoding process at the location of a previous IRAP access unit, if any, in the bitstream.
NOTE 1
When performing random access, decoders should infer all references to unavailable pictures as references to pictures containing only intra coding blocks and having sample values given by Y equal to (1 << ( BitDepthY content − 1)), Cb and Cr both equal to (1 << (BitDepthC − 1)) (mid-level grey), regardless of the value of exact_match_flag.
When exact_match_flag is equal to 0, the quality of the approximation at the recovery point is chosen by the encoding process and is not specified in this Specification.
broken_link_flag indicates the presence or absence of a broken link in the NAL unit stream at the location of the recovery point indication and is assigned further semantics as follows:
If broken_link_flag is equal to 1, pictures produced by starting the decoding process at the location of a previous IRAP access unit may contain undesirable visual artefacts to the extent that decoded pictures at and subsequent to the access unit associated with the recovery point indication in decoding order should not be displayed until the specified recovery point in output order.
Otherwise (broken_link_flag is equal to 0), no indication is given regarding any potential presence of visual artefacts.
Regardless of the value of the broken_link_flag, pictures subsequent to the specified recovery point in output order are specified to be correct or approximately correct in content.

In another version of this embodiment, the recovery_poc_cnt is fixed length coded and/or byte aligned. By doing so, accessing the information in the recovery point indication NAL unit is slightly easier, since it is known beforehand which bits to parse, which is useful when extracting selected information at the systems level. An example of this is shown in the table below.

|  | Descriptor |
| --- | --- |
| recovery_point_rbsp( ) { |  |
|   recovery_poc_cnt | u(6) |
|   exact_match_flag | u(1) |

|  | Descriptor |
| --- | --- |
|   broken_link_flag | u(1) |
| } |  |

In one version of this embodiment, the unavailable reference pictures of the pictures in the recovery point are generated before the decoding of these pictures. In one version, all pictures in the reference picture set (RPS) of the GDR picture are generated when the decoding is started with the recovery point, e.g. if the recovery point is first in the bitstream or if a random access operation is performed at the recovery point. The table below contains example specification text for generating unavailable reference pictures.

8.2.1 Decoding Process for Generating Unavailable Reference Pictures 8.2.1.1 General Decoding Process for Generating Unavailable Reference Pictures This process is invoked for any RPB picture in the bitstream if the corresponding RPB access unit is the first access unit in the CVS or a random access operation is initialized at the RPB access unit. The following applies:

For each RefPicSetStCurrBefore[i], with i in the range of 0 to NumPocStCurrBefore−1, inclusive, that is equal to "no reference picture", a picture is generated as specified in clause 8.2.1.2, and the following applies:
  The value of PicOrderCntVal for the generated picture is set equal to PocStCurrBeforc[i].
  The value of PicOutputFlag for the generated picture is set equal to 0.
  The generated picture is marked as "used for short-term reference".
  RefPicSetStCurrBefore[i] is set to be the generated reference picture.
  The value of nuh_layer_id for the generated picture is set equal to nuh_layer_id.

For each RefPicSetStCurrAfter[i], with i in the range of 0 to NumPocStCurrAfter−1, inclusive, that is equal to "no reference picture", a picture is generated as specified in clause 8.2.1.2, and the following applies:
  The value of PicOrderCntVal for the generated picture is set equal to PocStCurrAfter[i].
  The value of PicOutputFlag for the generated picture is set equal to 0.
  The generated picture is marked as "used for short-term reference".
  RefPicSetStCurrAfter[i] is set to be the generated reference picture.
  The value of nuh_layer_id for the generated picture is set equal to nuh_layer_id.

For each RefPicSetStFoll[i], with i in the range of 0 to NumPocStFoll−1, inclusive, that is equal to "no reference picture", a picture is generated and the following applies:
  The value of PicOrderCntVal for the generated picture is set equal to PocStFoll[i].
  The value of PicOutputFlag for the generated picture is set equal to 0.
  The generated picture is marked as "used for short-term reference".
  RefPicSetStFoll[i] is set to be the generated reference picture.
  The value of nuh_layer_id for the generated picture is set equal to nuh_layer_id of the current picture.

For each RefPicSetLtCurr[i], with i in the range of 0 to NumPocLtCurr−1, inclusive, that is equal to "no reference picture", a picture is generated as specified in clause 8.2.1.2, and the following applies:
  The value of PicOrderCntVal for the generated picture is set equal to PocLtCurr[i].
  The value of slice_pic_order_cnt_lsb for the generated picture is inferred to be equal to (PocLtCurr[i] & (MaxPicOrderCntLsb−1)).
  The value of PicOutputFlag for the generated picture is set equal to 0.
  The generated picture is marked as "used for long-term reference".
  RefPicSetLtCurr[i] is set to be the generated reference picture.
  The value of nuh_layer_id for the generated picture is set equal to nuh_layer_id.
For each RefPicSetLtFoll[i], with i in the range of 0 to NumPocLtFoll−1, inclusive, that is equal to "no reference picture", a picture is generated as specified in clause 8.2.1.2, and the following applies:
  The value of PicOrderCntVal for the generated picture is set equal to PocLtFoll[i].
  The value of slice_pic_order_cnt_lsb for the generated picture is inferred to be equal to (PocLtFoll[i] & (MaxPicOrderCntLsb−1)).
  The value of PicOutputFlag for the generated picture is set equal to 0.
  The generated picture is marked as "used for long-term reference".
  RefPicSetLtFoll[i] is set to be the generated reference picture.
  The value of nuh_layer_id for the generated picture is set equal to nuh_layer_id of the current picture.

8.2.1.2 Generation of One Unavailable Picture
When this process is invoked, an unavailable picture is generated as follows:
  The value of each element in the sample array $S_L$ for the picture is set equal to 1<<(BitDepthY−1).
  When ChromaArrayType is not equal to 0, the value of each element in the sample arrays $S_{Cb}$ and $S_{Cr}$ for the picture is set equal to 1<<(BitDepthC−1).
  The prediction mode CuPredMode[x][y] is set equal to MODE_INTRA for x=0 . . . pic_width_in_luma_samples−1, y=0 . . . pic_height_in_luma_samples−1.

Example encoding steps where all or some of the steps are processed for encoding a bitstream with recovery points and with recovery point indication in a non-VCL NAL unit:
For each picture to be encoded in the bitstream:
1. If the picture is the start of a recovery point (i.e., a GDR picture)
   a. Determine the recovery point period and the recovery point picture position
   b. Encode a recovery point indication NAL unit comprising information indicating the position of the recovery point picture in the bitstream
   c. Add GDR picture to the list of random access point pictures
   d. Encode SPS in the bitstream
   e. Encode PPS in the bitstream
2. If the picture is inside the recovery point period
   Encode the picture using partial intra refresh
   else
   Encode picture normally Example decoding steps for tuning in to a bitstream with recovery points and with recovery point indication in a non-VCL NAL unit:

1. While (recovery point indication not found) {
     Read bytes
     If NAL unit header in bytes {
       If NAL unit type in NAL unit header equals RPI_NUT
         Parse NAL unit and determine from recovery point period or pointer to the recovery point picture an indicator recovery_point_POC
     }
   }
2. Decode SPS
3. Decode PPS
4. Do {
     Generate unavailable reference pictures referenced by the current picture with identifier currPOC
     Decode current picture without outputting it
   } while (currPOC < recovery_point_POC)
5. Add GDR picture to the list of random access point pictures
6. Decode and output recovery point picture and following pictures normally When starting a CVS with a recovery point, the scanning procedure of the first step may not be needed and the first step may therefore be done without checking the condition in the while statement, i.e. it is always true that the recovery point indication has not been found before the decoding of the CVS has started.

In one version of the embodiment, if the associated SPS and PPS can be acquired by other means, for instance from an earlier instance in the bitstream or signaled out-of-band, it is not necessary to have the SPS or PPS encoded in or decoded from the same access unit as the recovery point indication In other words, a decoder may execute the method described in this embodiment by all or a subset of the following steps to tune into a bitstream:
  Derive NAL unit type values for NAL units in the bitstream by parsing NAL unit headers of NAL units in decoding order, compare each derived NAL unit type value with a predefined value representing a recovery point indication NAL unit type, find the first NAL unit in decoding order having a NAL unit type value that is equal to the predefined value;
  Decode the found NAL unit and decode a picture identification delta value D from decoded syntax elements of the found NAL unit;
  Find the first NAL unit carrying coded sample values for a picture (called the GDR picture) following the found NAL unit in decoding order;
  Decode the first NAL unit and derive 1) a picture order count value for the GDR picture and 2) a list of picture order count values representing picture order count values of reference pictures that were buffered by the encoder when the picture was encoded. The list may be a list of the picture order count values of the picture in the reference picture set for the GDR picture;
  For each picture order count value in the list of picture order count values, allocate or assign memory for a generated picture and generate the picture by at least one of the following: Set every luma sample value of the generated picture to a constant value, set every block mode to a constant value, set the picture order count of the generated picture to the associated picture order count value in the list.
  Decode the entire GDR picture;
  Derive a picture identification value V by adding the delta value D and the picture order count value for the GDR picture; and Decode pictures that follow the GDR picture in decoding order. For each decoded picture i, derive a picture order count value Pi and compare the identification value V with Pi. If the value Pi is less than V, suppress output of picture i. If the value Pi is equal to or greater than V, do not suppress output of picture i.

3. In VCL NAL Unit as Picture Type

In another embodiment, the indication of the recovery point is signaled as a picture type in a VCL NAL unit. In one version of this embodiment, two new picture types are defined: 1) a picture type NON_IRAP_RPJ_BEGIN that indicates the beginning of a recovery point and 2) a picture type NON_IRAP_RPJ_END that indicates the end of the recovery point.

Example specification text on top of the current VVC draft is shown in the below table:

| nal_unit_type | Name of nal_unit_type | Content of NAL unit and RBSP syntax structure | NAL unit type class |
|---|---|---|---|
| 0 | NON_RAP_NUT | Coded slice segment of a non-IRAP picture slice_layer_rbsp( ) | VCL |
| 1 | NON_IRAP_RPI_BEGIN_NUT | Coded slice segment of a non-IRAP picture starting a recovery point slice_layer_rbsp( ) | VCL |
| 2 | NON_IRAP_RPI_END_NUT | Coded slice segment of a non-IRAP picture ending a recovery point slice_layer_rbsp( ) | VCL |
| 3 | IRAP_NUT | Coded slice of an IRAP picture slice_layer_rbsp( ) | VCL |
| 4-15 | RSV_VCL_NUT | Reserved VCL NAL Units | VCL |
| 16 | SPS_NUT | Sequence parameter set seq_parameter_set_rbsp( ) | non-VCL |
| 17 | PPS_NUT | Picture parameter set pic_parameter_set_rbsp( ) | non-VCL |
| 18 | EOS_NUT | End of sequence end_of_seq_rbsp( ) | non-VCL |
| 19 | EOB_NUT | End of bitstream end_of_bitstream_rbsp( ) | non-VCL |
| 20, 21 | PREFIX_SEI_NUT SUFFIX_SEI_NUT | Supplemental enhancement information sei_rbsp( ) | non-VCL |
| 22-26 | RSV_NVCL | Reserved | non-VCL |
| 27-31 | UNSPEC | Unspecified | non-VCL |

In this embodiment, the POC for the recovery point picture does not need to be explicitly signaled.

To fully support temporal layers, NON_IRAP_RPI_BEGIN_NUT and NON_IRAP_RPI_END_NUT should be restricted to not be set for pictures of different temporal layers.

This embodiment, like embodiment 2, has the benefit of easy access to the recovery point information from the systems layer. One potential problem with this approach is that the recovery point indication becomes tied to the picture type. To allow for recovery points in pictures with different picture types (see for instance the many different picture types in HEVC), NAL unit types for all combinations or a subset of combinations are needed. This includes if one would like to support a recovery point starting at the same picture as the previous recovery point ended. Another issue is if the NAL unit with the NAL unit type specifying the end of the recovery point is lost. The decoder may then not know when the recovery point period is ending.

Also, to be able to support overlapping recovery points, a mechanism for mapping the end of a recovery point to the correct start of a new recovery point is needed.

In an alternative version of this embodiment, the information about the end of the recovery point—i.e. the POC for the recovery point picture—together with other information related to the recovery point is signaled by other means, such as in the SPS or in the PPS. Thus, in this version only NON_IRAP_RPI_BEGIN_NUT is signaled as a picture type.

In a similar alternative version of this embodiment, the end of the recovery point is signaled with a codeword early in the tile group header with its presence conditioned in the VCL NUT. That would solve the problem with the loss of the end of the recovery point. Example syntax and semantics for this alternative version is shown in the below table.

| | Descriptor |
|---|---|
| tile_group_header( ) { | |
|   tile_group_pic_parameter_set_id | ue(v) |
|   if(nal_unit_type == NON_IRAP_RPI_BEGIN_NUT) | |

-continued

| | Descriptor |
|---|---|
|     recovery_poc_cnt | se(v) |
|   if( NumTilesInPic > 1 ) { | |
|     tile_group_address | u(v) |
|     num_tiles_in_tile_group_minus1 | ue(v) |
|   } | |
|   ... | |
|   if( num_tiles_in_tile_group_minus1 > 0 ) { | |
|     offset_len_minus1 | ue(v) |
|     for( i = 0; i < num_tiles_in_tile_group_minus1; i++ ) | |
|       entry_point_offset_minus1[i] | u(v) |
|   } | |
|   byte_alignment( ) | |
| } | | recovery_poc_cnt specifies the recovery point of decoded pictures in output order. The picture that follows the current picture (with nal_unit_type equal to NON_IRAP_RPI_BEGIN_NUT) in decoding order in the CVS and that has PicOrderCntVal equal to the PicOrderCntVal of the current picture plus the value of recovery_poc_cnt is referred to as the recovery point picture. The recovery point picture shall not precede the current picture in decoding order. The value of recovery_poc_cnt shall be in the range of − MaxPicOrderCntLsb/2 to MaxPicOrderCntLsb/2 − 1, inclusive.

4. In a Picture Type NAL Unit (Assuming there are Picture Type NAL Units and Picture Data NAL Units)

In another embodiment, the VCL NAL units as defined in HEVC and VVC are divided into two categories: a picture data VCL NAL unit that contains the coded video data and the picture type non-VCL NAL unit that contains the picture type and related picture type information for the following picture data VCL NAL unit. An advantage with grouping the picture types in one NAL unit is that fewer NAL unit types need to be specified, and the NAL unit header could thus comprise fewer bits, which would save bits overall.

In this embodiment the recovery point indication is signaled in a NAL unit of the second category, the non-VCL picture type NAL unit.

In a first version of this embodiment, the recovery point is indicated by setting a flag in the non-VCL picture type NAL unit. Example syntax and semantics for this embodiment are shown below:

| nal_unit_type | Name of nal_unit_type | Content of NAL unit and RBSP syntax structure | NAL unit type class |
| --- | --- | --- | --- |
| 0 | PIC_DATA_VCL_NUT | Coded slice segment of a picture slice_layer_rbsp( ) | VCL |
| 1-14 | RSV_VCL_NUT | Reserved VCL NAL Units | VCL |
| 15 | PIC_TYPE_NUT | Picture type picture_type_rbsp( ) | non-VCL |
| 16 | SPS_NUT | Sequence parameter set seq_parameter_set_rbsp( ) | non-VCL |
| 17 | PPS_NUT | Picture parameter set pic_parameter_set_rbsp( ) | non-VCL |
| 18 | EOS_NUT | End of sequence end_of_seq_rbsp( ) | non-VCL |
| 19 | EOB_NUT | End of bitstream end_of_bitstream_rbsp( ) | non-VCL |
| 20, 21 | PREFIX_SEI_NUT SUFFIX_SEI_NUT | Supplemental enhancement information sei_rbsp( ) | non-VCL |
| 22-26 | RSV_NVCL | Reserved | non-VCL |
| 27-31 | UNSPEC | Unspecified | non-VCL |

| | Descriptor |
| --- | --- |
| picture_type_rbsp( ) { | |
|   picture_type | u(v) |
|   recovery_point_flag | u(1) |
|   if (recovery_point_flag) { | |
|     recovery_poc_cnt | se(v) |
|     exact_match_flag | u(1) |
|     broken_link_flag | u(1) |
|   } | |
|   ... | |
| } | | picture_type specifies the picture type for the picture associated with the access unit. picture_type equal to 0 specifies that the picture is an IRAP picture. picture_type equal to 1 specifies that the picture is a non-IRAP picture. picture_type shall be in the range of 0 to 1, inclusive. [Ed note: Note that there are more picture types anticipated for the final version of VVC]

recovery_point_flag equal to 1 specifies that the current picture is the first picture of a recovery point. The last picture of the recovery point is specified by recovery_poc_cnt. recovery_point_flag equal to 0 specifies that the current picture is not the first picture of a recovery point.

In the example syntax above, the recovery point indication is signaled with a separate flag: recovery_point_flag. In another version of this embodiment the recovery point indication is given its own picture type, e.g. 2, signaled in the picture_type syntax element. This is illustrated in the example syntax and semantics below:

|  | Descriptor |
|---|---|
| picture_type_rbsp( ) { |  |
|   picture_type | u(v) |
|   if (picture_type == 2) { |  |
|     recovery_poc_cnt | se(v) |
|     exact_match_flag | u(1) |
|     broken_link_flag | u(1) |
|   } |  |
|   . . . |  |
| } |  | picture_type specifies the picture type for the picture associated with the access unit.
picture_type equal to 0 specifies that the picture is an IRAP picture.
picture_type equal to 1 specifies that the picture is a non-IRAP picture.
picture_type equal to 2 specifies that the picture is the first picture of a recovery point where the last picture of the recovery point is specified by recovery_poc_cnt.
picture_type shall be in the range of 0 to 2, inclusive.

5. Signal Recovery Point Indication in PPS

In another embodiment, the indication of the recovery point is signaled in the PPS. The below table shows an example syntax and semantics for this:

|  | Descriptor |
|---|---|
| pic_parameter_set_rbsp( ) { |  |
|   . . . |  |
|   recovery_point_start_flag | u(1) |
|   if (recovery_point_start_flag) { |  |
|     recovery_poc_cnt | se(v) |
|     exact_match_flag | u(1) |
|     broken_link_flag | u(1) |
|   } |  |
|   . . . |  |
| } |  | recovery_point_start_flag equal to 1 specifies that the current picture is the first picture of a recovery point. The last picture of the recovery point is specified by recovery_poc_cnt. recovery_point_start_flag equal to 0 specifies that the current picture is not the first picture of are recovery point.

Having the recovery point specified in the PPS has the advantage that the cost for signaling the presence of a recovery point is relatively low. On the other hand, a flag is needed for indicating if the recovery point is available or not. The persistence of the recovery point may also be longer than the persistence of the PPS where it was specified, which may cause problems. Moreover, a decoder seeking to tune in to the bitstream should preferably not need to parse each PPS to find out if it is possible to perform a random access.

6. Signal Recovery Point Indication in Picture Header

It has been discussed that VVC may include a picture header to efficiently code header data that is identical between slices (will likely be called tile groups). Accordingly, in another embodiment, the indication of the recovery point is signaled in this new picture header. The below table shows an example syntax and semantics for the picture header:

|  | Descriptor |
|---|---|
| picture_header( ) { |  |
|   . . . |  |
|   recovery_point_start_flag | u(1) |
|   if (recovery_point_start_flag) { |  |

| -continued |  |
|---|---|
|  | Descriptor |
|     recovery_poc_cnt | se(v) |
|     exact_match_flag | u(1) |
|     broken_link_flag | u(1) |
|   } |  |
|   . . . |  |
| } |  | recovery_point_start_flag equal to 1 specifies that the current picture is the first picture of a recovery point. The last picture of the recovery point is specified by recovery_poc_cnt. recovery_point_start_flag equal to 0 specifies that the current picture is not the first picture of a recovery point.

A potential drawback with specifying the recovery point indication in a picture header would be that it may not be well exposed to the systems layer. A way to make it more accessible to the systems layer is to use fixed length coding for the recovery point syntax and the syntax elements prior to the recovery point syntax and/or put the recovery point syntax elements in the beginning of the picture header.

7. Recovery Point Indication Per Temporal Segment

In another embodiment, in contrast to the previous embodiments, the scope of the recovery point indication is not the whole picture, but a set of temporally aligned segments of a picture, where a segment could be a tile, a tile group, a slice or similar. Thus, the recovery point indication in this embodiment specifies when one or more segments of a picture are fully refreshed.

In one version of this embodiment a recovery point indication is signaled right before each segment, for instance in a NAL unit or a segment header.

In another version of this embodiment, the recovery point indication is signaled in the same container, e.g. a NAL unit, a PPS, a SPS or a picture header, for the whole picture but may have a different starting and/or ending picture for the recovery period for each segment.

In another version of this embodiment, the signaled recovery point indication may comprise both a starting and ending picture for the recovery point period of the whole picture and separate starting and/or ending picture for the recovery point period for each segment.

In another version of this embodiment, the recovery point indication comprises a flag to determine if the spatial scope is the whole picture or just a segment in the bitstream.

8. Signal in SPS if Recovery Points are Allowed in the Bitstream

In another embodiment a flag is signaled in the SPS specifying if recovery points may be available in the bitstream or not. When a decoder sees that this flag is turned off, it will know that it is not possible to tune in to the bitstream at recovery points.

This flag may alternatively be used as a condition whether to signal at a picture level if a recovery point is started or not, for instance the recovery_point_start_flag in the previous embodiment.

This flag may alternatively be signaled in another parameter set that has the whole sequence in scope, for instance a video parameter set (VPS) or a decoder parameter set (DPS).

Figure 4A:
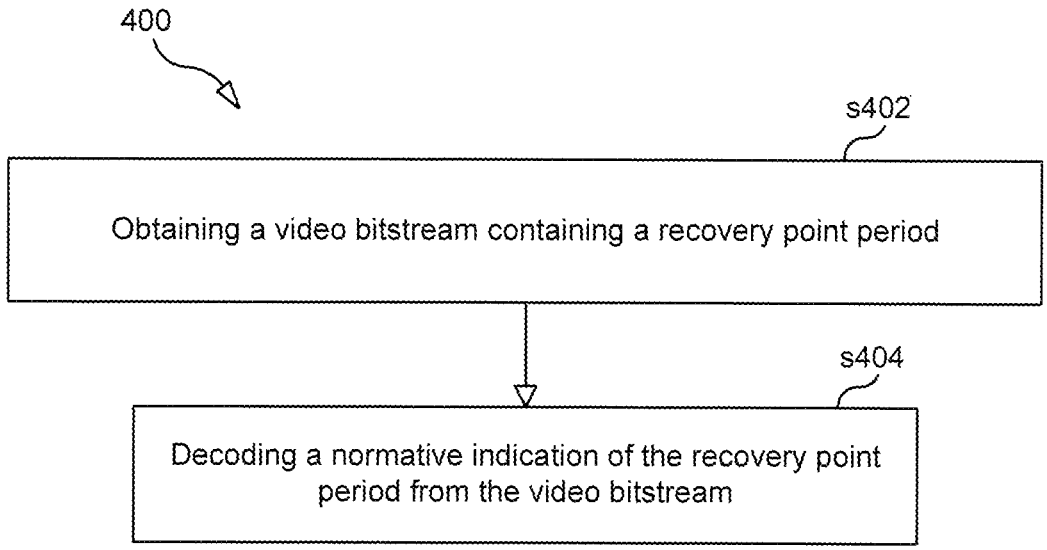
FIG. 4A is a flow chart illustrating a process according to an embodiment.

FIG. 4A is a flow chart illustrating a process 400 according to some embodiments.

Step s402 comprises obtaining a video bitstream. The video bitstream may comprise a coded video sequence (CVS) of pictures containing a recovery point period having a recovery point.

In some embodiments, the recovery point is a position in the bitstream where decoding may start at a non-IRAP picture. The recovery period starts at a particular picture (denoted "picture A") and ends at a picture B that follows picture A in decoding order. The video may be fully refreshed at picture B if the decoding is started at picture A and all other pictures in the recovery period following picture A and preceding picture B in decoding order, are decoded.

Step s404 comprises decoding a normative indication of the recovery point period from the video bitstream.

In some embodiments, the normative indication of the recovery point comprises a temporal position of picture A and/or picture B.

In some embodiments, the decoding is initialized at the recovery point and process 400 further comprises determining position of picture A, determining position of picture B, decoding picture A and all other pictures in the recovery period before picture B in decoding order without outputting them, and decoding and outputting picture B. Process 400 may further comprise performing a random access operation at the recovery point.

In some embodiments, a picture in the recovery period references an unavailable reference picture and the method further comprises generating the unavailable reference picture before decoding at least one of the pictures in the recovery period.

In some embodiments, the CVS starts with the recovery point. In some embodiments, the CVS is a conforming part of the bitstream that conforms to a standard specification such that a decoder that conforms to the standard specification is required to decode the CVS.

In some embodiments, the recovery point indication is decoded from a non-VCL NAL unit. In some embodiments, the non-VCL NAL unit from which the recovery point indication is decoded has a non-VCL NAL unit type that indicates that the non-VCL NAL unit is a recovery point indication non-VCL NAL unit.

In some embodiments, the recovery point is defined in a random access point access unit.

In some embodiments, at least one of indication of start of the recovery point and indication of end of recovery point is decoded from a NAL unit type syntax element in a VCL NAL unit. At least one of indication of start of the recovery point and indication of end of recovery point may be decoded from one of a PPS, SPS or tile group header.

In some embodiments, process 400 further comprises decoding the picture type of each picture from a picture type NAL unit and decoding the picture data for each picture from a picture data NAL unit. Indication of start of recovery point at picture A and/or indication of end of recovery point at picture B may be decoded from a picture type NAL unit. Indication of the recovery point may be decoded from the PPS and/or from a picture head.

In some embodiments, the recovery point indication is only valid for a spatial subset of the picture. The bitstream may contain a syntax element in SPS determining if the bitstream may comprise recovery points or not. In some embodiments, picture A and picture B are constrained to belong to the same temporal layer. The recovery point indication may comprise a broken link flag. The recovery point indication and picture A may belong to the same access unit.

In some embodiments, the normative indication of the recovery point is ignored if the recovery point does not start the CVS or if a random access operation is not performed at the recovery point. Normative recovery point indication may not be contained in an SEI message.

Figure 4B:
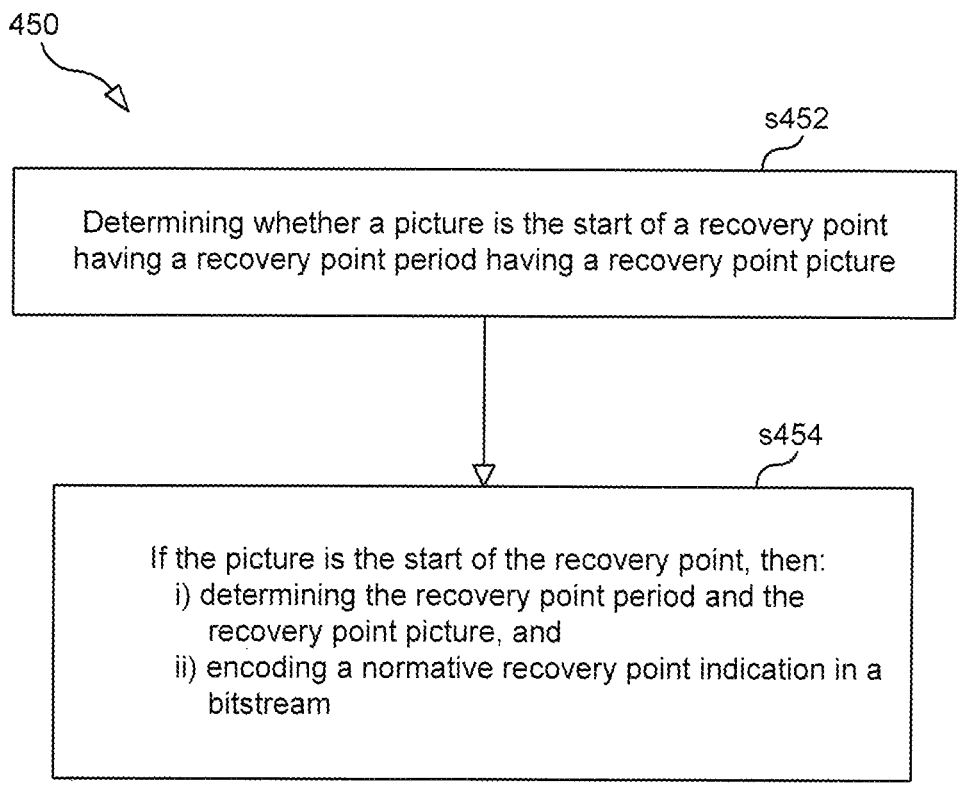
FIG. 4B is a flow chart illustrating a process according to an embodiment.

FIG. 4B is a flow chart illustrating a process 450 according to some embodiments.

Step s452 comprises determining whether a picture is the start of a recovery point. The recovery point may have a recovery point period and the recovery point period may have a recovery point picture. In some embodiments, the recovery point picture is the last coded picture in decoding order in the recovery point period.

Step s454 comprises if the picture is the start of the recovery point (i.e., the start of the recovery point period), then performing at least the steps of: i) determining the recovery point period and the recovery point picture, and ii) encoding a normative recovery point indication in a bitstream. The normative recovery point indication may comprise information indicating the position of the recovery point picture in the bitstream. In some embodiments, step s454 also includes performing the step of defining the picture as a GDR picture if the picture is the start of the recovery point.

In some embodiments, the normative recovery point indication specifies 1) where the recovery point period begins and/or 2) where the recovery point ends. The normative recovery point indication may not be contained in an SEI message.

Figure 5A:
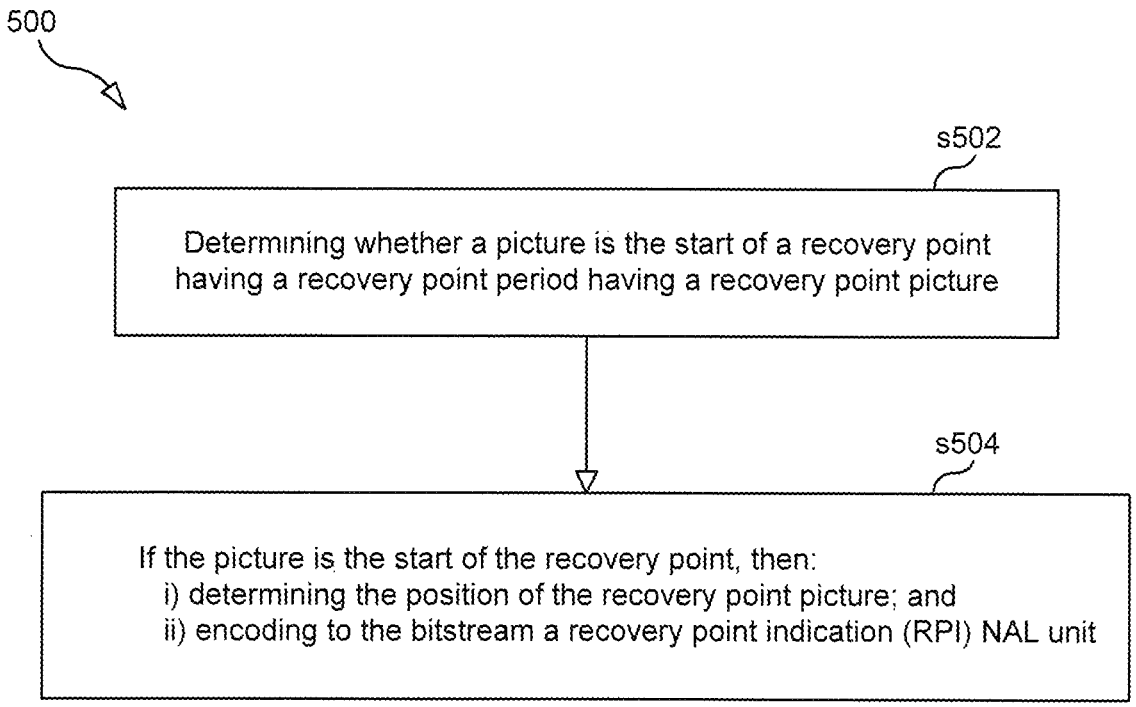
FIG. 5A is a flow chart illustrating a process according to an embodiment.

FIG. 5A is a flow chart illustrating a process 500 according to some embodiments.

Step s502 comprises determining whether a picture is the start of a recovery point. The recovery point may have a recovery point period and the recovery period may have a recovery point picture.

Step s504 comprises if the picture is the start of the recovery point, then: i) determining the position of the recovery point picture, and ii) encoding to a bitstream a recovery point indication (RPI) NAL unit.

In some embodiments, the RPI NAL unit comprises information indicating the recovery point period and/or information indicating the position of the recovery point picture.

In some embodiments, process 500 further comprises adding the picture to a list of random access point pictures if the picture is the start of the recovery point. Process 500 may further comprise performing, if the picture is at the start of the recovery point, adding to the bitstream an encoded SPS and adding to the bitstream an encoded PPS.

In some embodiments, process 500 further comprises if the picture is inside the recovery point period, encoding the picture using partial intra refresh.

Figure 5B:
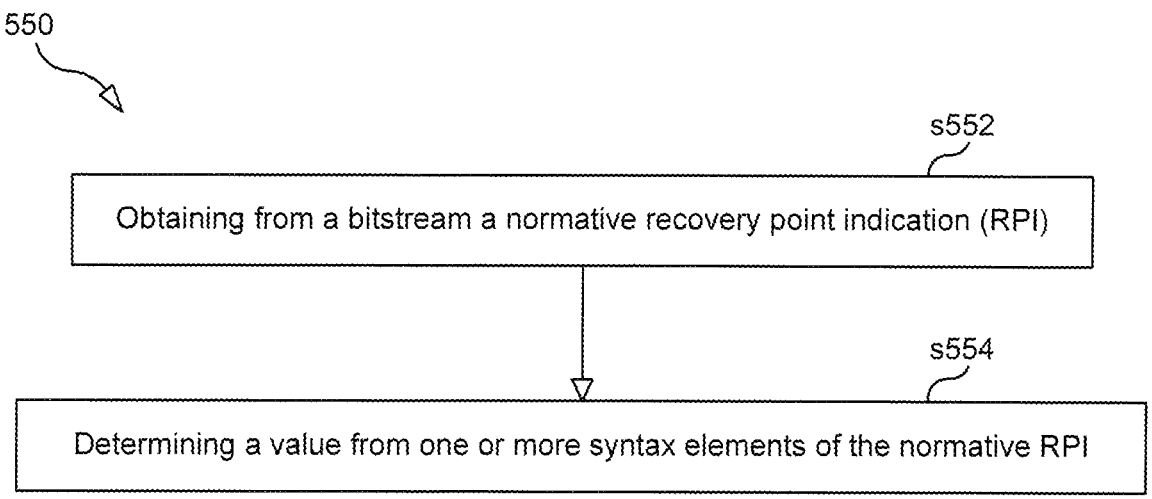
FIG. 5B is a flow chart illustrating a process according to an embodiment.

FIG. 5B is a flow chart illustrating a process 550 according to some embodiments.

Step s552 comprises obtaining from a bitstream a normative recovery point indication (RPI).

Step s554 comprises determining a value from one or more syntax elements of the normative RPI, wherein the value specifies a recovery point picture.

In some embodiments, the normative RPI is not contained in an SEI message.

Figure 6:
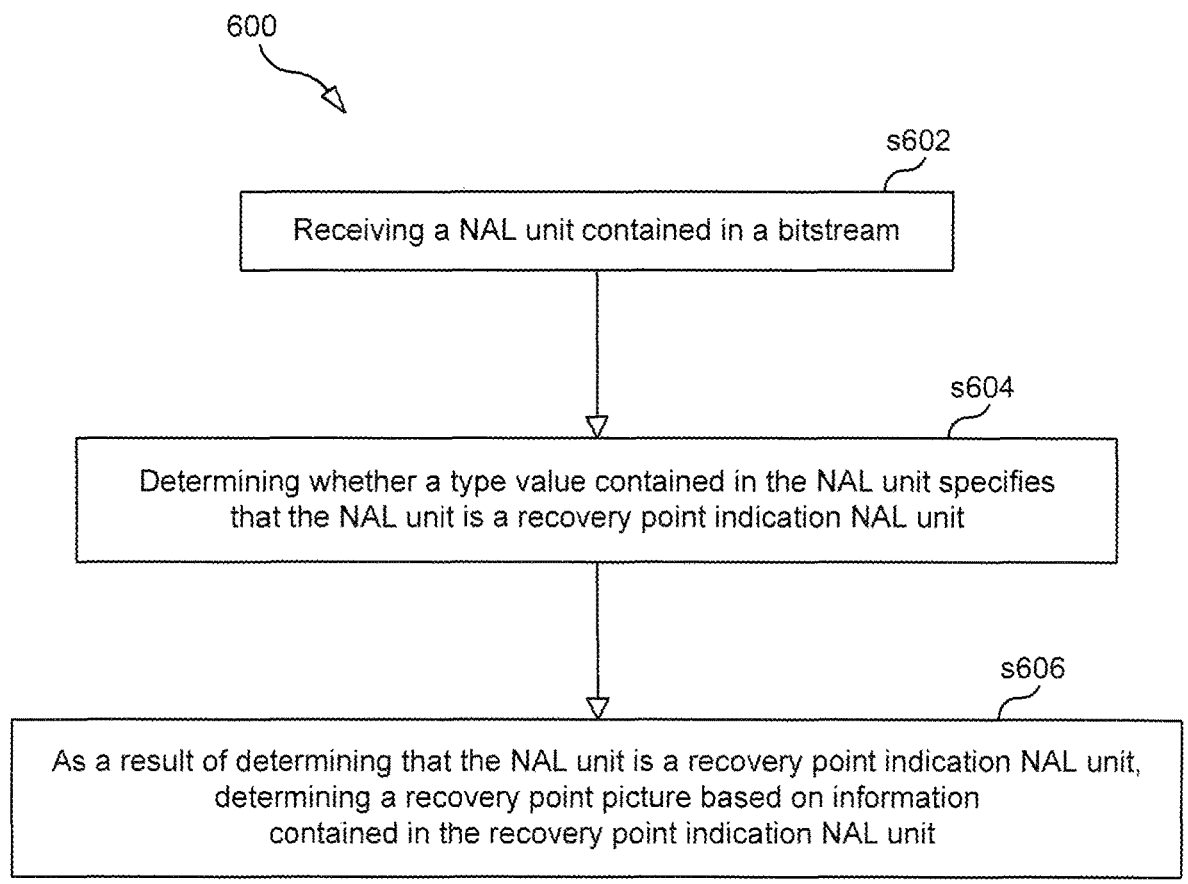
FIG. 6 is a flow chart illustrating a process according to an embodiment.

FIG. 6 is a flow chart illustrating a process 600 according to some embodiments.

Step s602 comprises receiving a NAL unit contained in a bitstream. The NAL unit may contain a type value.

Step s604 comprises determining whether the type value specifies that the NAL unit is a recovery point indication NAL unit.

Step s606 comprises as a result of determining that the NAL unit is a recovery point indication NAL unit, determining a recovery point picture based on information contained in the recovery point indication NAL unit.

In some embodiments, the information is a value in the range of −M/2 to M/2−1, inclusive, wherein M is a predefined value.

Figure 7:
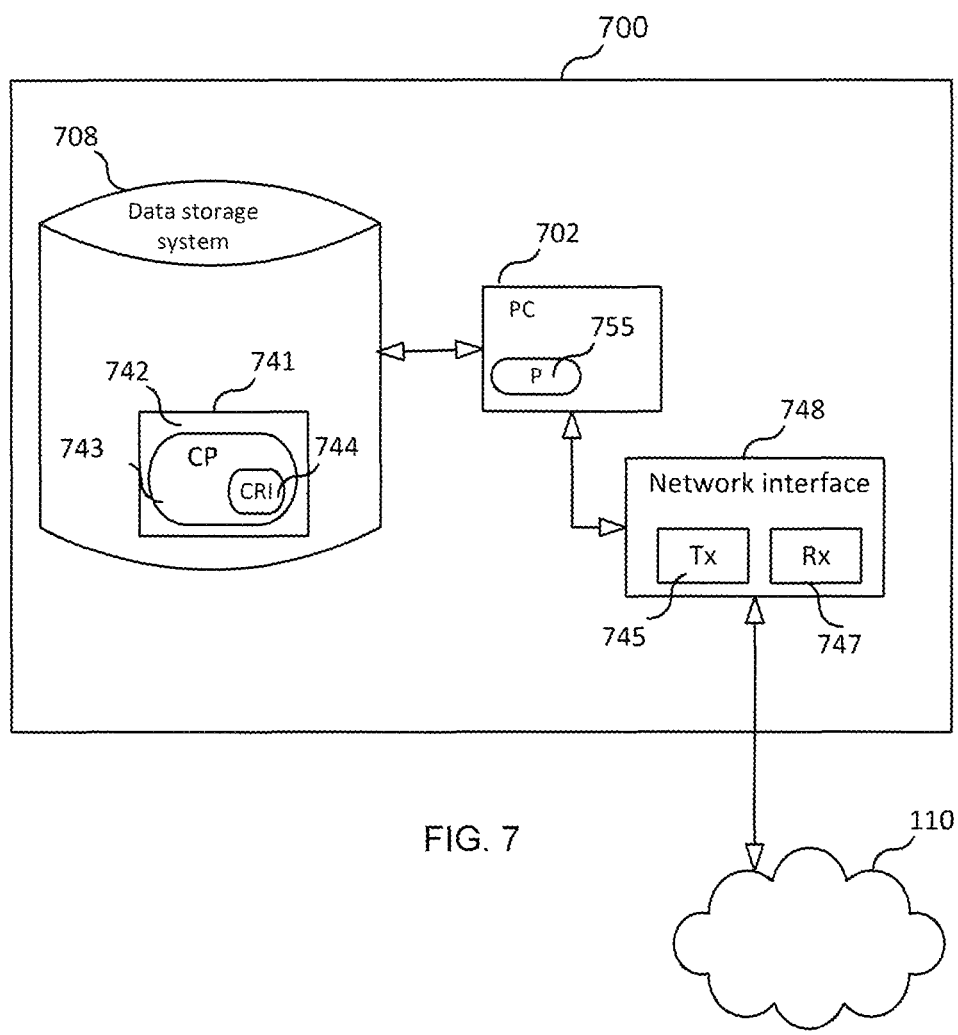
FIG. 7 is a block diagram of an apparatus according to one embodiment.

FIG. 7 is a block diagram of an apparatus 700, according to some embodiments, for implementing the methods described herein (i.e., implementing an encoder and/or a decoder). When apparatus 700 implements a decoder, apparatus 700 may be referred to as a "decoding apparatus 700," and when apparatus 700 implements an encoder, apparatus 700 may be referred to as an "encoding apparatus 700." As shown in FIG. 7, apparatus 700 may comprise: processing circuitry (PC) 702, which may include one or more processors (P) 755 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed; a network interface 748, for connecting to a network 110, the network interface 748 comprising a transmitter (Tx) 745 and a receiver (Rx) 747 for enabling apparatus 700 to transmit data and receive data; and a local storage unit (a.k.a., "data storage system") 708, which may include one or more non-volatile storage devices and/or one or more volatile storage devices. In embodiments where PC 702 includes a programmable processor, a computer program product (CPP) 741 may be provided. CPP 741 includes a computer readable medium (CRM) 742 storing a computer program (CP) 743 comprising computer readable instructions (CRI) 744. CRM 742 may be a non-transitory computer readable medium, such as, magnetic media (e.g., a hard disk), optical media, memory devices (e.g., random access memory, flash memory), and the like. In some embodiments, the CRI 744 of computer program 743 is configured such that when executed by PC 702, the CRI causes apparatus 700 to perform steps described herein (e.g., steps described herein with reference to the flow charts). In other embodiments, apparatus 700 may be configured to perform steps described herein without the need for code. That is, for example, PC 702 may consist merely of one or more ASICs. Hence, the features of the embodiments described herein may be implemented in hardware and/or software.

Summary of Various Ones of the Disclosed Embodiments

A1. A method (400) for decoding a video bitstream, the video bitstream comprising a sequence of pictures comprising a picture A and a picture B, wherein picture A starts a recovery point period and picture B ends the recovery point period, the method comprising: obtaining (s402) the video bitstream; and decoding (s404) from the video bitstream a normative indication of the recovery point period, wherein the normative indication of the recovery point period indicates that picture A starts the recovery point period and/or that picture B ends the recovery point period.

A2. The method of embodiment A1, wherein a video is fully refreshed at picture B if picture A and all pictures, if any, in the recovery point period following picture A and preceding picture B in decoding order are decoded.

A3. The method of embodiment A1, wherein picture A and B are different pictures and picture B follows picture A in decoding order, or picture A and picture B are the same picture.

A4. The method of any one of embodiments A1-A3, wherein the normative indication of the recovery point period comprises a temporal position of picture A and/or picture B.

A5. The method of any one of embodiments A1-A4, further comprising: determining the position of picture A; determining the position of picture B; decoding picture A and all other pictures in the recovery point period before picture B in decoding order without outputting them; and decoding and outputting picture B.

A6. The method of any one of embodiments A1-A5, further comprising performing a random access operation at the start of the recovery point period.

A7. The method of any one of embodiments A1-A6, wherein a picture in the recovery point period references an unavailable reference picture, and the method further comprises generating the unavailable reference picture before decoding at least one of the pictures in the recovery point period.

A8. The method of any one of embodiments A1-A7, wherein the sequence of pictures is a coded video sequence, CVS, and the CVS starts with picture A.

A9. The method of embodiment A8, wherein the CVS is a conforming part of the bitstream that conforms to a standard specification such that a decoder that conforms to the standard specification is required to decode the CVS.

A10. The method of any one of embodiments A1-A9, wherein the normative indication of the recovery point period is decoded from a non-video coding layer, non-VCL, network abstraction layer, NAL, unit.

A11. The method of embodiment A10, wherein the non-VCL NAL unit has a non-VCL NAL unit type that indicates that the non-VCL NAL unit is a non-VCL NAL unit that comprises the normative indication of the recovery point period.

A12. The method of any one of embodiments A1-A11, wherein the recovery point period is defined in a random access point access unit.

A13. The method of any one of embodiments A1-A9, wherein an indication of the start of the recovery point period and/or an indication of the end of the recovery point period is decoded from a NAL unit type syntax element in a VCL NAL unit.

A14. The method of any one of embodiments A1-A13, wherein an indication of the start of the recovery point period and/or an indication of the end of the recovery point period is decoded from one of a picture parameter set, PPS, sequence parameter set, SPS, or tile group header.

A15. The method of any one of embodiments A1-A9, further comprising decoding a picture type of each picture in the sequence of pictures from a picture type NAL unit; and decoding picture data for each said picture from a picture data NAL unit, wherein an indication of the start of the recovery point period at picture A and/or an indication of the end of the recovery point period at picture B is decoded from a picture type NAL unit.

A16. The method of any one of embodiments A1-A9, wherein the normative indication of the recovery point period is decoded from a picture parameter set, PPS.

A17. The method of any one of embodiments A1-A16, wherein the normative indication that picture B ends the recovery point period is decoded from a picture header.

A18. The method of any one of embodiments A1-A17, wherein decoding the normative indication of the recovery point period from the video bitstream comprises: determining, based on a first NAL unit included in the video bitstream, that picture A starts the recovery point period; and determining, based on a second NAL unit included in the video bitstream, that picture B ends the recovery point period.

A19. The method of embodiment A18, wherein determining, based on the first NAL unit, that picture A starts the recovery point period comprises detecting that the first NAL unit has a specific NAL unit type, the second NAL unit is a picture header NAL unit for picture A, and the picture header NAL unit for picture A comprises a syntax element (e.g., recovery_poc_cnt) that identifies picture B.

A20. The method of any one of embodiments A1-A9, wherein an indication of the start of the recovery point period is decoded from a picture header and/or an indication of the end of the recovery point period is decoded from the picture header.

A21. The method of embodiment A20, wherein determining that picture A starts the recovery point period comprises decoding a syntax element in the picture header, and/or determining that picture B ends the recovery point period comprises decoding a syntax element (e.g., recovery_poc_cnt) in the picture header.

A22. The method of any one of the previous embodiments, wherein the normative indication of the recovery point period is only valid for a spatial subset of the picture.

A23. The method of any one of the previous embodiments, wherein the bitstream contains a syntax element in a sequence parameter set, SPS, indicating whether or not recovery point periods may be available in the bitstream.

A24. The method of any one of the previous embodiments, wherein picture A and picture B are constrained to belong to the same temporal layer.

A25. The method of any one of the previous embodiments, wherein the normative indication of the recovery point period comprises a broken link flag.

A26. The method of any one of the previous embodiments, wherein the normative indication of the recovery point period and picture A belong to the same access unit.

A27. The method of any one of the previous embodiments, wherein picture A is a gradual decoding refresh (GDR) picture.

A28. The method of any one of the previous embodiments wherein picture B is a recovery point picture. A29. The method of any one of the previous embodiments, wherein the normative indication of the recovery point period is ignored if picture A does not start a CVS and if a random access operation is not performed at the picture A.

A30. The method of any one of the previous embodiments, wherein the normative indication of the recovery point period is not contained in an SEI message.

A31. A method for decoding a bitstream, the method comprising: obtaining from the bitstream a normative recovery point period indication, RPI; determining a value from one or more syntax elements of the normative RPI, wherein the value specifies a recovery point picture.

A32. The method of embodiment A31, wherein the normative RPI is not contained in a supplemental enhancement information, SEI, message.

A33. A method for decoding a bitstream, the method comprising: receiving a network abstraction layer, NAL, unit contained in the bitstream, the NAL unit containing a type value; determining whether the type value specifies that the NAL unit comprises recovery point picture information that identifies a recovery point picture; and determining the recovery point picture based on the recovery point picture information.

A34. The method of embodiment A33, wherein the information is a value in the range of −M/2 to M/2−1, inclusive, wherein M is a predefined value.

A35. A method for encoding a bitstream, the method comprising: determining whether a particular picture is the start of a recovery point period, wherein a recovery point picture is the last coded picture in decoding order in the recovery point period; and as a result of determining that the particular picture is the start of the recovery point period, then performing the steps of: determining the recovery point picture; and encoding a normative recovery point period indication in the bitstream, wherein the normative recovery point period indication comprises information indicating the position of the recovery point picture in the bitstream and/or information indicating the position of the particular picture in the bitstream.

A36. The method of embodiment A35, wherein the normative indication of the recovery point period specifies: 1) where the recovery point period begins and/or 2) where the recovery point period ends.

A37. The method of embodiment A35 or A36, wherein the normative indication of the recovery point period is not contained in a supplemental enhancement information, SEI, message.

A38. The method of any one of embodiments A35-A37, wherein a video is fully refreshed at the recovery point picture if the particular picture and all pictures, if any, in the recovery point period following the particular picture and preceding the recovery point picture in decoding order are decoded.

A39. The method of any one of embodiments A35-A38, wherein the particular picture and the recovery point picture are different pictures and the recovery point picture follows the particular picture in decoding order, or the particular picture and the recovery point picture are the same picture.

A40. The method of any one of embodiments A35-A39, wherein the normative indication of the recovery point period comprises a temporal position of the particular picture and/or a temporal position of the recovery point picture.

A41. The method of any one of embodiments A35-A40, wherein the normative indication of the recovery point period is included in a non-video coding layer, non-VCL, network abstraction layer, NAL, unit.

A42. The method of embodiment A41, wherein the non-VCL NAL unit has a non-VCL NAL unit type that indicates that the non-VCL NAL unit is a non-VCL NAL unit that comprises the normative indication of the recovery point period.

A43a. The method of any one of embodiments A35-A42, wherein the information indicating the position of the recovery point picture in the bitstream and/or the information indicating the position of the particular picture in the bitstream is encoded in one or more syntax elements of a picture header.

A43b. The method of any one of embodiments A35-A43, further comprising defining the particular picture as a gradual decoding refresh, GDR, picture as a result of determining that the particular picture is the start of the recovery point period.

A44. A method for encoding a bitstream, the method comprising: determining whether a particular picture is the start of a recovery point period; and as a result of determining that the particular picture is the start of the recovery point period, then performing the steps of: determining a position of a recovery point picture for the recovery point period; and encoding to the bitstream a recovery point period indication, RPI, network abstraction layer, NAL, unit.

A45. The method of embodiment A44, wherein the RPI NAL unit comprises information indicating that the particular picture is the start of a recovery point period and/or information indicating the position of the recovery point picture.

A46. The method of embodiment A44 or A45, further comprising adding the particular picture to a list of random access point pictures if the particular picture is the start of the recovery point period.

A47. The method of any one of embodiments A35-A46, further comprising performing the following steps if the particular picture is at the start of the recovery point period: add to the bitstream an encoded sequence parameter set, SPS; and add to the bitstream an encoded picture parameter set, PPS.

A48. The method of any one of embodiments A35-A47, further comprising: if the picture is inside the recovery point period, then encoding the picture using partial intra refresh.

A49. A computer program 743 comprising instructions 744 which when executed by processing circuitry 702 causes the processing circuitry 702 to perform the method of any one of embodiments 1-48.

A50. A carrier containing the computer program of embodiment A49, wherein the carrier is one of an electronic signal, an optical signal, a radio signal, and a computer readable storage medium 742.

A51. A decoding apparatus 700 for decoding a video bitstream comprising a picture A and a picture B, wherein picture A starts a recovery point period and picture B ends the recovery point period, the decoding apparatus being adapted to: obtain the video bitstream; and decode from the video bitstream a normative indication of the recovery point period, wherein the normative indication of the recovery point period indicates that picture A starts the recovery point period and/or that picture B ends the recovery point period A52. The decoding apparatus 700 of embodiment A51, the decoding apparatus being further adapted to perform the method of any one of embodiments 2-34.

A53. A decoding apparatus 700 for decoding a video bitstream, the decoding apparatus comprising: a computer readable storage medium 742; and processing circuitry 702 coupled to the computer readable storage medium, wherein the processing circuitry is configured to cause the decoding apparatus to perform the method of any one of embodiments 1-34.

A54. An encoding apparatus 700 for encoding a bitstream, the encoding apparatus being adapted to: determine whether a particular picture is the start of a recovery point period, wherein a recovery point picture is the last coded picture in decoding order in the recovery point period; and as a result of determining that the particular picture is the start of the recovery point period, then perform the steps of: a) defining the particular picture as a gradual decoding refresh, GDR, picture; b) determining the recovery point picture; and c) encoding a normative recovery point period indication in the bitstream, wherein the normative recovery point period indication comprises information indicating the position of the recovery point picture in the bitstream and/or information indicating the position of the particular picture in the bitstream.

PA1. A method for decoding a video bitstream, the video bitstream comprising a coded video sequence (CVS) of pictures containing a recovery point (i.e., at least one recovery point), wherein: a) the recovery point is a position in the bitstream where decoding may start at a non-IRAP picture, b) the recovery point has a recovery period starting at a picture A and ending at a picture B, c) the video is fully refreshed at picture B if the decoding is started at picture A and all other pictures, if any, in the recovery period following picture A and preceding picture B in decoding order, are decoded, and d) the method comprises: obtaining (e.g., receiving) the video bitstream; decoding a normative indication of the recovery point from the video bitstream.

PA1b. The method of embodiment PA1, wherein picture A and B are different pictures and picture B follows picture A in decoding order, or picture A and picture B are the same picture (i.e., the recovery period may start at picture A and also end at picture A).

PA2. The method of embodiment PA1, where the normative indication of the recovery point comprises a temporal position of picture A and/or picture B.

PA3. The method of embodiment PA1 or PA2, wherein the decoding is initialized at the recovery point and the method further comprises: determining position of picture A; determining position of picture B; decoding picture A and all other pictures in the recovery period before picture B in decoding order without outputting them; and decoding and outputting picture B.

Perform random access at recovery point:

PA4. The method of any one of the previous embodiments, further comprising performing a random access operation at the recovery point Generation of unavailable reference pictures:

PA5. The method of embodiment PA3, wherein a picture in the recovery period references an unavailable reference picture, and the method further comprises generating the unavailable reference picture before decoding at least one of the pictures in the recovery period.

Start CVS with recovery point:

PA6. The method of any one of the previous embodiments where the CVS starts with the recovery point.

PA6b. The method of embodiment PA6, wherein the CVS is a conforming part of the bitstream that conforms to a standard specification such that a decoder that conforms to the standard specification is required to decode the CVS.

In non-VCL NAL unit:

PA7. The method of any one of embodiments PA1-PA6, where the recovery point indication is decoded from a non-VCL NAL unit.

PA7a. The method of embodiment PA7, wherein the non-VCL NAL unit has a non-VCL NAL unit type that indicates that the non-VCL NAL unit is a recovery point indication non-VCL NAL unit.

PA8. The method of any one of the previous embodiments where the recovery point is defined in a random access point access unit.

In VCL NAL unit as picture type:

PA9. The method of any one of embodiments PA1-PA6, where at least one of indication of start of the recovery point and indication of end of recovery point is decoded from a NAL unit type syntax element in a VCL NAL unit.

PA10. The method of any one of the previous embodiments, where at least one of indication of start of the recovery point and indication of end of recovery point is decoded from one of a PPS, SPS or tile group header.

In a picture type NAL unit (assuming there are picture type NAL units and picture data NAL units):

PA11. The method of any one of the previous embodiments, further comprising decoding the picture type of each picture from a picture type NAL unit; and decoding the picture data for each picture from a picture data NAL unit, wherein indication of start of recovery point at picture A and/or indication of end of recovery point at picture B is decoded from a picture type NAL unit.

In PPS:

PA12. The method of any one of the previous embodiments, where the indication of the recovery point is decoded from the PPS In picture header:

PA13. The method of any one of the previous embodiments, where the indication of the recovery point is decoded from a picture header. Embodiment 7—Recovery point indication per temporal segment: PA14. The method of any one of the previous embodiments where the recovery point indication is only valid for a spatial subset of the picture.

Signal recovery point support in SPS:

PA15. The method of any one of the previous embodiments, where the bitstream contains a syntax element in SPS determining if the bitstream may comprise recovery points or not.

PA16. The method of any one of the previous embodiments, where picture A and picture B are constrained to belong to the same temporal layer.

PA17. The method of any one of the previous embodiments, where the recovery point indication comprises a broken link flag.

PA18. The method of any one of the previous embodiments where the recovery point indication and picture A belong to the same access unit.

PA19. The method of any one of the previous embodiments, where the normative indication of the recovery point is ignored if the recovery point does not start the CVS and if a random access operation is not performed at the recovery point. PA20. The method of any one of the previous embodiments, wherein the normative recovery point indication is not contained in an SEI message.

PB1. A method for encoding a bitstream, the method comprising: determining whether a picture is the start of a recovery point, the recovery point having a recovery point period and the recovery point period having a recovery point picture, wherein the recovery point picture is the last coded picture in decoding order in the recovery point period; and if the picture is the start of the recovery point, then: a) define the picture as a GDR picture; b) determine the recovery point period and the recovery point picture; and c) encode a normative recovery point indication in the bitstream, wherein the normative recovery point indication comprises information indicating the position of the recovery point picture in the bitstream.

PB2. The method of embodiment PB1, wherein the normative recovery point indication specifies: 1) where the recovery point period begins and/or 2) where the recovery point ends.

PB3. The method of embodiment PB1 or PB3, wherein the normative recovery point indication is not contained in an SEI message.

PB4. A method for encoding a bitstream, the method comprising: determining whether a picture is the start of a recovery point, the recovery point having a recovery point period having a recovery point picture; and if the picture is the start of the recovery point, then: a) determine the recovery point period; b) determine the position of the recovery point picture; and c) encode to the bitstream a recovery point indication (RPI) NAL unit.

PB5. The method of embodiment PB4, wherein the RPI NAL unit comprises i) information indicating the recovery point period and/or information indicating the position of the recovery point picture.

PB6. The method of embodiment PB4 or PB5, further comprising adding the picture to a list of random access point pictures if the picture is the start of the recovery point.

PB7. The method of any one of embodiments PB1-PB6, further comprising performing the following steps if the picture is at the start of the recovery point: add to the bitstream an encoded SPS; and add to the bitstream an encoded PPS.

PB8. The method of any one of embodiments PB1-PB7, further comprising: if the picture is inside the recovery point period, then encoding the picture using partial intra refresh.

PC1. A method for decoding a bitstream, the method comprising: obtaining from the bitstream a normative recovery point indication (RPI); determining a value from one or more syntax elements of the normative RPI, wherein the value specifies a recovery point picture.

PC2. The method of embodiment PC1, wherein the normative RPI is not contained in an SEI message.

PC3. A method for decoding a bitstream, the method comprising: receiving a NAL unit contained in the bitstream, the NAL unit containing a type value; determining whether the type value specifies that the NAL unit is a recovery point indication NAL unit (i.e. a NAL unit containing a recovery point indication); as a result of determining that the NAL unit is a recovery point indication NAL unit, determining a recovery point picture based on information contained in the recovery point indication NAL unit.

PC4. The method of embodiment PC3 wherein the information is a value in the range of $-M/2$ to $M/2-1$, inclusive, wherein M is a predefined value.

While various embodiments are described herein (including the Appendix, if any), it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The Appendix provided herewith contains the relevant portion of a contribution providing a proposal to the VVC specification.

APPENDIX

This contribution proposes to add a recovery point indication NAL unit to the VVC specification, using a new non-VLC NAL unit type. The position of the recovery point indication NAL unit in the bitstream specifies the start of the recovery period. The end of the recovery period, the recovery point picture, is specified by a recovery_poc_cnt UVLC code word, which is the only payload element in the proposed recovery point indication NAL unit raw byte sequence payload (RBSP). It is further proposed that starting the decoding at a recovery point is supported through the following process: 1) decode a recovery point indication NAL unit that defines a recovery point begin (RPB) access unit and the start and end picture of the recovery point; 2) start decoding at the start picture; 3) generate unavailable pictures from the RPS of the start picture; 4) suppress output of the start picture and all pictures that follow in decoding order until the end picture is decoded.

In comparison to the recovery point SEI message in HEVC, the proposed solution is normatively specified and does not contain the exact match flag nor the broken link flag. Having the indication of the recovery point normatively specified in VVC has the following advantages: 1) The encoder will know that a decoder shall support the recovery point indication NAL unit. Thus, no additional IRAP pictures need to be encoded to ensure random access when the decoder implementation is unknown; 2) By a normative recovery point signaling in the VVC specification, there is no need for external specifications to mandate the SEI message; 3) Indicating the presence of recovery points non-normatively in an SEI message may cause issues if support of recovery point coding tools would be specified normatively in VVC, for example if syntax or processes are different for any picture in the recovery period than for other pictures.

In order to make recovery points normative in VVC, the contribution proposes that a CVS may start with a recovery point signaled by the new NAL unit type. Alternatives for normatively specifying the recovery point are discussed in the contribution.

Introduction

Both AVC and HEVC specify a recovery point SEI message which assists a decoder in determining when the decoding process will produce acceptable pictures for display after the decoder initiates random access at the recovery point or. The SEI message is optional for the decoder to support although it is made mandatory in some external specifications, such as the DVB specification.

TABLE

| Recovery point SEI message syntax in HEVC | |
|---|---|
| | Descriptor |
| recovery_point( payloadSize ) { | |
|    recovery_poc_cnt | se(v) |
|    exact_match_flag | u(1) |
|    broken_link_flag | u(1) |
| } | |

This contribution addresses the following mandate from AHG14 on progressive intra refresh: "Study normative solutions to improve intra refresh performance against encoder-only intra refresh"

Regardless if coding tools are normatively specified in VVC to support recovery points or not, it is assessed that a normative solution of indicating the start and end of a recovery point would be beneficial.

Problem Statement

The following issues have been identified with indicating recovery points non-normatively using a SEI message:
(1) The encoder may not be aware if an unknown decoder supports the recovery point SEI message or not and may thus need to send periodic IRAP pictures to ensure that the decoder will be able to tune into a bitstream. This is sub-optimal in terms of bandwidth and creates a bottleneck in low-delay applications.
(2) The recovery point SEI message may not be supported in a consistent way for external specifications, which may cause interoperability issues. For instance, in DVB it is mandated for the decoder that "HEVC IRDs (Integrated Receiver-Decoders) shall support the use of SEI of the following message types: . . . —Recovery Point SEI message" and for the encoder: "When present, the recovery_poc_cnt shall be set to 0, exact_match_flag shall be set to 1, and broken_link_flag shall be set to 0" In ISO/IEC 14496-15 [2] it is stated that "the video coding system can include the concept of a 'gradual decoding refresh' or random access recovery point recovery. This may be signaled in the bit-stream using a mechanism such as the recovery point SEI message.". No restrictions are set for the exact_match_flag or the broken link flag in ISO/IEC 14996-15. Thus, the usage of the recovery point SEI message for HEVC is normatively mandated for decoders in DVB with restrictions for the flags for the encoder. For ISO/JEC 14496-15 the support for the recovery point SEI message is optional without restrictions for the flags.
(3) It is assessed that it would be useful to allow a CVS to start with a recovery point, e.g. after splitting low-delay bitstreams encoded with recovery points. However, a bitstream starting with a non-IRAP picture and a recovery point SEI message is not a conforming bitstream in neither of AVC, HEVC, nor the VVC draft, since a CVS may only start with an IRAP picture.
(4) Indicating the presence of recovery points non-normatively in a SEI message may cause issues if support of recovery point coding tools would be specified normatively in VVC, for example if syntax or processes are different for any picture in the recovery period than for other pictures.

Discussion

Benefits of a Normative Recovery Point Indication

Specifying a recovery point normatively in VVC has at least the following four advantages:
(1) Decoder support of recovery points. The encoder will know that a decoder shall support the recovery point indication NAL unit. Thus, no additional IRAP pictures need to be encoded to ensure random access when the decoder implementation is unknown.
(2) Alignment between external specifications. By a normative signaling of the recovery point indication in the VVC specification, there is no need for external specifications to mandate the SEI message. Thus, the usage of recovery points would be aligned between external specifications.
(3) Splitting of bitstreams. A bitstream encoded with normative recovery points may be divided into legal CVSs at the recovery points. A CVS may thus start with a recovery point access unit.
(4) Specific coding level tools may be used for recovery points. AHG14 is investigating potential benefits of specifying normative coding level tools for progressive intra refresh in VVC. Indicating the presence of recovery points normatively enables normative progressive intra coding tools to be used for random access in a straight-forward way.

Accordingly, a normative solution for specifying recovery points including indicating the start and end of a recovery point would be beneficial.

Three Options for signaling the normative recovery point indication:
(1) In a picture header. It has been discussed that VVC may include a picture header to efficiently code header data that are identical between slices (or tile groups). The indication of the recovery point may be specified here. However, the recovery point indication would then not be well exposed to the systems layer.

(2) As a new NAL unit with a non-VCL NAL unit type and with the recovery point specified in the recovery point indication NAL unit. Specifying the recovery point indication as a NAL unit type makes it easy to access at the systems layer. A decoder seeking to perform a random access in a bitstream only needs to parse the NAL unit headers in the bitstream to find where to tune in. Also, in comparison to the PPS approach, signaling overhead is only made when the recovery point indication is signaled (PPS, in contrast, would require a flag for turning it off).

(3) In a VCL NAL unit with a new NAL unit type. An alternative is to specify the start of a recovery point as a new VCL NAL unit type. The end of the recovery point may be specified in another new VCL NAL unit type. This approach also has the benefit that it is easy to access the recovery point information from the systems layer. One potential problem with this approach is that the recovery point indication becomes tied to the picture type. To allow for recovery points in pictures with different picture types, NAL unit types for all combinations are needed. Another issue is if the NAL unit with the NAL unit type specifying the end of the recovery point is lost. Moreover, overlapping recovery points may be problematic.

Design Considerations for Normative Recovery Points

Recovery Point Begin (RPB) Access Unit

To indicate as early as possible that an access unit is a recovery point it is desired to put the recovery point indication early in the access unit, before any VCL NAL units. The access unit containing the recovery point indication is referred to as the recovery point begin (RPB) access unit and the picture in the access unit is referred to as the RPB picture.

The associated SPS and PPS shall be activated prior to the decoding of the pictures associated with the recovery point.

Align Access of Recovery Points and IRAP Picture

In order to normatively specify that an access unit containing a recovery point indication may be used for random access or to start a CVS it is desired to align the access of recovery points with the access of IRAP pictures.

The contribution, therefore, proposes to define that a CVS may start with either an IRAP picture or an RPB picture.

Generation of Unavailable Reference Pictures

Compared to the recovery point SEI message in HEVC, a normative recovery point solution should preferably have a more precise handling of unavailable reference pictures. One way of solving this is to mandate generation of all reference pictures in the RPS (or similar picture management system) of the RPB picture.

Suppression of Picture Output

When the decoding is started at a RPB picture, either after a random access operation has been initialized at the RBP access unit or if the RBP access unit is the first access unit in a CVS, the RPB and the pictures following the RPB picture in decoding order until but not including the recovery point picture, may not have correct output.

This disclosure, therefore, proposes that the RPB picture and all pictures that follow the RPB picture in decoding order until but not including the recovery point picture, shall not be output, if the decoding is started at the RPB picture.

Proposal

It is proposed to add a recovery point indication NAL unit to the VVC specification, using a new non-VLC NAL unit type. The position of the recovery point indication NAL unit in the bitstream specifies the start of the recovery period. The end of the recovery period, the recovery point picture, is specified by a recovery_poc_cnt UVLC code word, which is the only payload element in the proposed recovery point indication NAL unit RBSP. It is further proposed that starting the decoding at a recovery point is supported through the following process: 1) decode a recovery point indication NAL unit that defines a recovery point begin (RPB) access unit and the start and end picture of the recovery point; 2) start decoding at the start picture; 3) generate unavailable pictures from the RPS of the start picture; and 4) suppress output of the start picture and all pictures that follow in decoding order until the end picture is decoded.

It is assessed that the exact_match_flag specified in the recovery point SEI message in HEVC, is not useful when specifying the recovery point in a normative way since an exact match is required. It is also assessed that the broken_link flag may be useful, but it is not considered in this proposal since BLA pictures are not defined for VVC.

Proposed Changes to the VVC Draft Text

The following syntax and semantics are proposed to be included the next VVC draft.

3 DEFINITIONS

. . .

| | |
|---|---|
| 3.18 | coded video sequence (CVS): A sequence of access units that consists, in decoding order, of an IRAP access unit or an RPB access unit, followed by zero or more access units that are not IRAP access units, including all subsequent access units up to but not including any subsequent access unit that is an IRAP access unit. |
| . . . | |
| 3.74 | recovery point: A point in the bitstream where the next bit in the bitstream is the first bit of a RPB access unit. |
| 3.75 | recovery point begin (RPB) access unit: An access unit that contains a recovery point indication NAL unit. |
| 3.76 | recovery point begin (RPB) picture: The coded picture in an RPB access unit. |
| 3.77 | recovery point period: The set of pictures including an RPB picture and all pictures that follow the RPB picture until and including the recovery point picture indicated by the recovery point indication NAL unit in the access unit containing the RPB picture. |
| 3.78 | recovery point picture: The last coded picture in decoding order in a recovery point period. |
| . . . | |
| 7.3.2.5 | Recovery point indication RBSP syntax |

-continued

|  | Descriptor |
|---|---|
| recovery_point_indication_rbsp( ) { <br>    recovery_poc_cnt <br>    rbsp_trailing_bits( ) <br> } | se(v) |

| 7.4.2.2 | NAL unit header semantics |
|---|---|

. . .

Table 7-1 - NAL unit type codes and NAL unit type classes

| nal_unit_type | Name of nal_unit_type | Content of NAL unit and RBSP syntax structure | NAL unit type class |
|---|---|---|---|
| 0 | NON_IRAP_NUT | Coded slice segment of a non-IRAP picture slice_layer_rbsp( ) | VCL |
| 1 | IRAP_NUT | Coded slice of an IRAP picture slice_layer_rbsp( ) | VCL |
| 2-15 | RSV_VCL_NUT | Reserved VCL NAL Units | VCL |
| 16 | SPS_NUT | Sequence parameter set seq_parameter_set_rbsp( ) | non-VCL |
| 17 | PPS_NUT | Picture parameter set pic_parameter_set_rbsp( ) | non-VCL |
| 18 | EOS_NUT | End of sequence end_of_seq_rbsp( ) | non-VCL |
| 19 | EOB_NUT | End of bitstream end_of_bitstream_rbsp( ) | non-VCL |
| 20 | RPI_NUT | Recovery point indication recovery_point_indication_rbsp( ) | non-VCL |
| 21, 22 | PREFIX_SEI_NUT SUFFIX_SEI_NUT | Supplemental enhancement information sei_rbsp( ) | non-VCL |
| 23-26 | RSV_NVCL | Reserved | non-VCL |
| 27-31 | UNSPEC | Unspecified | non-VCL |

. . .

When nal_unit_type is equal to RPI_NUT, TemporalId shall be equal to 0.

. . .

| 7.4.3.5 | Recovery Point Indication RBSP semantics |
|---|---|

The RPI NAL unit shall precede any VCL NAL units in the access unit containing the RPI NAL unit. All VCL NAL units in an access unit containing the RPI NAL unit shall have TemporalId equal to 0.

If an RPB access unit containing an RPI NAL unit is not the first access unit in the CVS and a random access operation is not initiliazed at the RPB access unit, the RPI NAL unit in the RPB access unit shall be ignored.

Otherwise, if an RPB access unit containing an RPI NAL unit is the first access unit in the CVS or a random access operation is initialized at the RPB access unit, the following applies:

The decoder shall generate all reference pictures included in the RPS of the recovery point begin (RPB) picture of the RPB access unit according to the process described in [see example specification text 8.2.1.1 below for this].

The poc_msb_cycle_val for the RPB picture shall be set to 0 when deriving the PicOrderCntVal for the RPB picture The RPB picture and all pictures that follow the RPB picture in decoding order shall be decoded.

The RPB picture and all pictures that follow the RPB picture in decoding order until but not including the recovery point picture, shall not be output.

Any SPS or PPS RBSP that is referred to by the picture in a RPB access unit or by any picture following that picture in decoding order shall be available to the decoding process prior to its activation.

It is a requirement of bitstream conformance that the decoded pictures that follow the recovery point picture in decoding order shall be an exact match to the pictures that would be produced by starting the decoding process at the location of an IRAP or RPB access unit that precedes the RPB picture that belong to the same recovery point period as the recovery point picture in decoding order, if any, in the bitstream.

recovery_poc_cnt specifies picture order count of the recovery point picture. The picture that follows the current picture in decoding order that has PicOrderCntVal equal to the PicOrderCntVal of the current picture plus the value of recovery_poc_cnt is referred to as the recovery point picture. The recovery point picture shall not precede the current picture in decoding order. The value of recovery_poc_cnt shall be in the range of − MaxPicOrderCntLsb/2 to MaxPicOrderCntLsb/2 − 1, inclusive.

| 8.2 | Tile group decoding process |
|---|---|
| 8.2.1 | Decoding process for generating unavailable reference pictures |
| 8.2.1.1 | General decoding process for generating unavailable reference pictures |

This process is invoked for any RPB picture in the bitstream if the corresponding RPB access unit is the first access unit in the CVS or a random access operation is initialized at the RPB access unit.

-continued

The following applies:
 For each RefPicSetStCurrBefore[i], with i in the range of 0 to NumPocStCurrBefore − 1,
 inclusive, that is equal to "no reference picture", a picture is generated as specified in clause
 8.2.1.2 and the following applies:
  The value of PicOrderCntVal for the generated picture is set equal to PocStCurrBefore[i].
  The value of PicOutputFlag for the generated picture is set equal to 0.
  The generated picture is marked as "used for short-term reference".
  RefPicSetStCurrBefore[i] is set to be the generated reference picture.
  The value of nuh_layer_id for the generated picture is set equal to nuh_layer_id.
 For each RefPicSetStCurrAfter[i], with i in the range of 0 to NumPocStCurrAfter − 1,
 inclusive, that is equal to "no reference picture", a picture is generated as specified in clause
 8.2.1.2 and the following applies:
  The value of PicOrderCntVal for the generated picture is set equal to PocStCurrAfter[i].
  The value of PicOutputFlag for the generated picture is set equal to 0.
  The generated picture is marked as "used for short-term reference".
  RefPicSetStCurrAfter[i] is set to be the generated reference picture.
  The value of nuh_layer_id for the generated picture is set equal to nuh_layer_id.
 For each RefPicSetStFoll[i], with i in the range of 0 to NumPocStFoll − 1, inclusive, that is
 equal to "no reference picture", a picture is generated as specified in clause 8.2.1.2 and the
 following applies:
  The value of PicOrderCntVal for the generated picture is set equal to PocStFoll[i].
  The value of PicOutputFlag for the generated picture is set equal to 0.
  The generated picture is marked as "used for short-term reference".
  RefPicSetStFoll[i] is set to be the generated reference picture.
  The value of nuh_layer_id for the generated picture is set equal to nuh_layer_id of the
  current picture.
 For each RefPicSetLtCurr[i], with i in the range of 0 to NumPocLtCurr − 1, inclusive, that is
 equal to "no reference picture", a picture is generated as specified in clause 8.2.1.2 and the
 following applies:
  The value of PicOrderCntVal for the generated picture is set equal to PocLtCurr[i].
  The value of slice_pic_order_cnt_lsb for the generated picture is inferred to be equal to
  (PocLtCurr[i] & ( MaxPicOrderCntLsb − 1 ) ).
  The value of PicOutputFlag for the generated picture is set equal to 0.
  The generated picture is marked as "used for long-term reference".
  RefPicSetLtCurr[i] is set to be the generated reference picture.
  The value of nuh_layer_id for the generated picture is set equal to nuh_layer_id.
 For each RefPicSetLtFoll[i], with i in the range of 0 to NumPocLtFoll − 1, inclusive, that is
 equal to "no reference picture", a picture is generated as specified in clause 8.2.1.2 and the
 following applies:
  The value of PicOrderCntVal for the generated picture is set equal to PocLtFoll[i].
  The value of slice_pic_order_cnt_lsb for the generated picture is inferred to be equal
  to ( PocLtFoll[i] & ( MaxPicOrderCntLsb − 1 ) ).
  The value of PicOutputFlag for the generated picture is set equal to 0.
  The generated picture is marked as "used for long-term reference".
  RefPicSetLtFoll[i] is set to be the generated reference picture.
  The value of nuh_layer_id for the generated picture is set equal to nuh_layer_id of the
  current picture.
8.2.1.2   Generation of one unavailable picture
When this process is invoked, an unavailable picture is generated as follows:
 The value of each element in the sample array $S_L$ for the picture is set equal to 1 <<
 ( BitDepthY − 1 ).
 When ChromaArrayType is not equal to 0, the value of each element in the sample arrays $S_{Cb}$
 and $S_{Cr}$ for the picture is set equal to 1 << ( BitDepthC − 1).
 The prediction mode CuPredMode[ x ][ y ] is set equal to MODE_INTRA for x = 0 . . .
 pic_width_in_luma_samples − 1, y = 0 . . . pic_height_in_luma_samples − 1.

The invention claimed is:

1. A method implemented by a decoder for decoding a video bitstream, the method comprising:
obtaining the video bitstream, wherein the video bitstream comprises a coded video sequence (CVS) of pictures, the CVS of pictures beginning with a gradual decoding refresh (GDR) picture and including a recovery point picture, wherein the GDR picture starts a recovery point period and the recovery point picture ends the recovery point period;
decoding from the CVS a normative indication of the recovery point period; and
decoding an indication of the start of the recovery point period and/or an indication of the end of the recovery point period from a network abstraction layer (NAL) unit having a type of picture header, wherein
the normative indication of the recovery point period indicates that the GDR picture starts the recovery point period, and
the decoder is required to decode the CVS.

2. The method of claim 1, comprising:
determining a position of the GDR picture;
decoding information for identifying the recovery point picture;
decoding, without outputting, the GDR picture and all pictures, if any, in the recovery point period following the GDR picture in decoding order until the recovery point picture is identified and decoded; and
outputting the decoded recovery point picture, thereby refreshing a decoding of the video bitstream.

3. The method of claim 1, wherein the normative indication of the recovery point period indicates a temporal position of the GDR picture in the sequence of pictures.

4. The method of claim 1, wherein a picture in the recovery point period references an unavailable reference picture, and the method further comprises:

generating the unavailable reference picture before decoding at least one of the pictures in the recovery point period.

5. The method of claim 1, comprising:
decoding the normative indication of the recovery point period from a GDR access unit.

6. The method of claim 1, comprising:
decoding a normative indication that the recovery point picture ends the recovery point period from a picture header.

7. The method of claim 1, wherein
the NAL unit includes a syntax element indicating that the GDR picture starts the recovery point period.

8. The method of claim 1, comprising:
determining that the GDR picture starts the recovery point period by decoding a syntax element from the NAL unit, and/or
determining that the recovery point picture ends the recovery point period by decoding a syntax element from the NAL unit.

9. The method of claim 1, wherein the bitstream contains a syntax element in at least one of a sequence parameter set (SPS), a video parameter set (VPS), and a decoding parameter set (DPS) indicating whether or not a recovery point period may be available in the bitstream.

10. The method of claim 1, wherein the normative indication of the recovery point period and the GDR picture belong to the same access unit.

11. A method for encoding a bitstream, the method comprising:
determining that a particular picture in a coded video sequence (CVS) of pictures in the bitstream is to be a start of a recovery point period, wherein a last coded picture in decoding order in the recovery point period is to be a recovery point picture;
defining the particular picture as a gradual decoding refresh (GDR) picture such that the CVS begins with the GDR picture and includes the recovery point picture; and
encoding in the CVS a normative indication of the recovery point period in the bitstream, wherein
the normative indication of the recovery point period comprises information indicating that the recovery point period starts with the GDR picture, and
an indication of the start of the recovery point period is encoded in a network abstraction layer (NAL) unit having a type of picture header and/or an indication of the end of the recovery point period is encoded in the NAL unit.

12. The method of claim 11, wherein encoding the normative indication of the recovery point period comprises specifying a position of the GDR picture that starts the recovery point period in the sequence of pictures.

13. The method of claim 11, comprising:
specifying the position of the GDR picture as a temporal position of the GDR picture in the sequence of pictures.

14. The method of claim 11, comprising:
encoding the GDR picture and the recovery point picture as the same picture.

15. The method of claim 11, comprising:
including information specifying the position of the GDR picture and/or information for use in identifying the recovery point picture in the sequence of pictures in one or more syntax elements of a picture header.

16. A non-transitory computer readable medium storing a computer program comprising instructions which when executed by processing circuitry causes the processing circuitry to perform the method of claim 1.

17. A non-transitory computer readable medium storing a computer program comprising instructions which when executed by processing circuitry causes the processing circuitry to perform the method of claim 11.

18. A decoding apparatus for decoding a video bitstream comprising a coded video sequence (CVS) of pictures beginning with a gradual decoding refresh (GDR) picture and including a recovery point picture, wherein the GDR picture starts a recovery point period and the recovery point picture ends the recovery point period, the decoding apparatus comprising:
memory; and
processing circuitry, wherein the decoding apparatus is configured to perform a process that comprises:
obtaining the video bitstream, wherein the video bitstream comprises a coded video sequence (CVS) of pictures, the CVS of pictures beginning with a gradual decoding refresh (GDR) picture and including a recovery point picture, wherein the GDR picture starts a recovery point period and the recovery point picture ends the recovery point period;
decoding from the CVS a normative indication of the recovery point period; and
decoding from a network abstraction layer (NAL) unit having a type of picture header an indication of the start of the recovery point period and/or an indication of the end of the recovery point period, wherein
the normative indication of the recovery point period indicates that the GDR picture starts the recovery point period.

19. An encoding apparatus for encoding a bitstream, the encoding apparatus comprising:
memory; and
processing circuitry, wherein the encoding apparatus is configured to:
determine that a particular picture in a coded video sequence (CVS) of pictures in the bitstream is to be a start of a recovery point period, wherein a last coded picture in decoding order in the recovery point period is to be a recovery point picture;
defining the particular picture as a gradual decoding refresh (GDR) picture such that the CVS begins with the GDR picture and includes the recovery point picture;
determining the recovery point picture; and
encoding in the CVS a normative indication of the recovery point period in the bitstream, wherein
the normative indication of the recovery point period comprises information indicating that the recovery point period starts with the GDR picture, and
an indication of the start of the recovery point period is encoded in a network abstraction layer (NAL) unit having a type of picture header and/or an indication of the end of the recovery point period is encoded in the NAL unit.

* * * * *